US 12,335,211 B2

(12) United States Patent
Boyd et al.

(10) Patent No.: US 12,335,211 B2
(45) Date of Patent: *Jun. 17, 2025

(54) EXTERNAL MESSAGING FUNCTION FOR AN INTERACTION SYSTEM

(71) Applicant: Snap Inc., Santa Monica, CA (US)

(72) Inventors: Nathan Kenneth Boyd, Los Angeles, CA (US); David Phillip Taitz, Los Angeles, CA (US); Jeremy Baker Voss, Los Angeles, CA (US); Xingnan Xia, Bellevue, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,763

(22) Filed: Mar. 18, 2024

(65) Prior Publication Data

US 2024/0223519 A1    Jul. 4, 2024

Related U.S. Application Data

(63) Continuation of application No. 18/132,267, filed on Apr. 7, 2023, now Pat. No. 11,973,730.

(Continued)

(51) Int. Cl.
*G06F 15/16* (2006.01)
*H04L 51/046* (2022.01)
*G06F 3/04842* (2022.01)

(52) U.S. Cl.
CPC ........ *H04L 51/046* (2013.01); *G06F 3/04842* (2013.01)

(58) Field of Classification Search
CPC ........................... H04L 51/046; G06F 3/04842

(Continued)

(56) References Cited

U.S. PATENT DOCUMENTS 666,223 A    1/1901   Shedlock
4,581,634 A  4/1986   Williams
(Continued)

FOREIGN PATENT DOCUMENTS

CA    2887596 A1    7/2015
CN    1653829 A     8/2005
(Continued)

OTHER PUBLICATIONS

US 11,943,183 B2, 03/2024, Andreou et al. (withdrawn)
(Continued)

*Primary Examiner* — Liang Che A Wang
(74) *Attorney, Agent, or Firm* — Schwegman Lundberg & Woessner, P.A.

(57) ABSTRACT

A sender holds a first platform account with an interaction system. The sender selects a content item to be shared with a recipient. In response to determining that a recipient identifier of the recipient is not linked to a platform account, an off-platform communication is transmitted to a second user device associated with the recipient identifier. The off-platform communication is in an electronic format supported by the second user device and contains a user-selectable registration link. In response to detecting establishment of a second platform account linked to the recipient identifier, the recipient is enabled to access the content item on the second user device via a user interface provided by an interaction application. A relationship between the first platform account and the second platform account is established within the interaction system.

20 Claims, 15 Drawing Sheets

Related U.S. Application Data

(60) Provisional application No. 63/348,412, filed on Jun. 2, 2022.

(58) Field of Classification Search
USPC .................................. 709/204, 205, 206
See application file for complete search history.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,681,393 B1 | 1/2004 | Bauminger et al. |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,732,103 B1 | 5/2004 | Strick et al. |
| 6,757,713 B1 | 6/2004 | Ogilvie |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,397,806 B2 | 7/2008 | Burger |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,478,402 B2 | 1/2009 | Christensen et al. |
| 7,496,347 B2 | 2/2009 | Puranik |
| 7,508,419 B2 | 3/2009 | Toyama et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,818,415 B2 | 10/2010 | Jhanji |
| 7,856,360 B2 | 12/2010 | Kramer et al. |
| 7,912,896 B2 | 3/2011 | Wolovitz et al. |
| 8,001,204 B2 | 8/2011 | Burtner et al. |
| 8,032,586 B2 | 10/2011 | Challenger et al. |
| 8,065,171 B2 | 11/2011 | Nguyen et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |

(56) References Cited

U.S. PATENT DOCUMENTS

| | | |
|---|---|---|
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,643,677 B2 | 2/2014 | Suzuki |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| RE45,040 E | 7/2014 | Fish et al. |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,843,835 B1 | 9/2014 | Busey et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,933,967 B2 | 1/2015 | Huston |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,118,723 B1 | 8/2015 | Su et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B2 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn |
| 9,237,202 B1 | 1/2016 | Sehn |
| 9,245,025 B2 | 1/2016 | Chen |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,344,606 B2 | 5/2016 | Hartley et al. |
| 9,356,904 B1 | 5/2016 | Ho |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,495,086 B2 | 11/2016 | May et al. |
| 9,503,873 B1 | 11/2016 | Marshalla |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,628,950 B1 | 4/2017 | Noeth et al. |
| 9,639,561 B2 | 5/2017 | Roberts et al. |
| 9,652,896 B1 | 5/2017 | Jurgenson et al. |
| 9,659,244 B2 | 5/2017 | Anderton et al. |
| 9,681,099 B1 | 6/2017 | Deets, Jr. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,785,796 B1 | 10/2017 | Murphy et al. |
| 9,817,995 B2 | 11/2017 | Papakipos et al. |
| 9,825,898 B2 | 11/2017 | Sehn |
| 9,854,219 B2 | 12/2017 | Sehn |
| 9,918,193 B1 | 3/2018 | Nguyen et al. |
| 9,961,520 B2 | 5/2018 | Brooks et al. |
| 9,977,510 B1 | 5/2018 | Moffett |
| 9,992,146 B2 | 6/2018 | Fabre et al. |
| 10,037,498 B2 | 7/2018 | Correll et al. |
| 10,049,330 B2 | 8/2018 | Alag et al. |
| 10,395,257 B2 | 8/2019 | Patterson |
| 10,471,341 B1 | 11/2019 | Xu |
| 10,559,107 B1 | 2/2020 | Charlton et al. |
| 10,674,311 B1 | 6/2020 | Bouba et al. |
| 10,686,748 B1 | 6/2020 | Dorsey et al. |
| 10,728,701 B1* | 7/2020 | Chandrasekaran ..... A63F 13/00 |
| 10,791,077 B2 | 9/2020 | Andreou et al. |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 11,032,670 B1 | 6/2021 | Baylin et al. |
| 11,039,270 B2 | 6/2021 | Bouba et al. |
| 11,134,036 B2 | 9/2021 | Taitz et al. |
| 11,166,123 B1 | 11/2021 | Guillaume |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 11,411,900 B2 | 8/2022 | Boyd et al. |
| 11,418,465 B2 | 8/2022 | Taitz et al. |
| 11,722,442 B2 | 8/2023 | Taitz et al. |
| 11,727,430 B2* | 8/2023 | Mitchell ................ G06Q 20/26 705/14.3 |
| 11,838,252 B2 | 12/2023 | Andreou et al. |
| 11,921,993 B2 | 3/2024 | Tyler et al. |
| 11,973,730 B2 | 4/2024 | Boyd et al. |
| 11,978,127 B2 | 5/2024 | Elias et al. |
| 12,069,017 B2 | 8/2024 | Andreou et al. |
| 2002/0047868 A1 | 4/2002 | Miyazawa |
| 2002/0070954 A1 | 6/2002 | Lang |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0156848 A1 | 10/2002 | Grouse |
| 2003/0001846 A1 | 1/2003 | Davis et al. |
| 2003/0012150 A1 | 1/2003 | Chapuran et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |

(56) References Cited

U.S. PATENT DOCUMENTS

| | | |
|---|---|---|
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0217106 A1 | 11/2003 | Adar |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0162881 A1 | 8/2004 | Digate |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0267975 A1 | 12/2005 | Qureshi et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198316 A1 | 8/2007 | Boland et al. |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0242131 A1 | 10/2007 | Sanz-Pastor |
| 2007/0243887 A1 | 10/2007 | Bandhole et al. |
| 2007/0244750 A1 | 10/2007 | Grannan et al. |
| 2007/0250366 A1 | 10/2007 | Nurmi |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ilkeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0076453 A1 | 3/2008 | Cai |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0098079 A1 | 4/2008 | Sanghavi |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0162615 A1 | 7/2008 | Hurmola et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199230 A1* | 8/2009 | Kumar ............... G06Q 30/0268 725/32 |
| 2009/0199242 A1 | 8/2009 | Johnson et al. |
| 2009/0215469 A1 | 8/2009 | Fisher et al. |
| 2009/0228322 A1 | 9/2009 | van Os et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0290690 A1 | 11/2009 | Fan et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0069104 A1 | 3/2010 | Neil |
| 2010/0082427 A1 | 4/2010 | Burgener et al. |
| 2010/0082513 A1 | 4/2010 | Liu |
| 2010/0082693 A1 | 4/2010 | Hugg et al. |

(56) References Cited

U.S. PATENT DOCUMENTS

| | | |
|---|---|---|
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131598 A1 | 5/2010 | Ruelas-Arana |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2010/0325220 A1 | 12/2010 | Skinner et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0035678 A1 | 2/2011 | Hamrick et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066363 A1 | 3/2011 | Kimishima |
| 2011/0066743 A1 | 3/2011 | Hurley et al. |
| 2011/0083101 A1 | 4/2011 | Sharon et al. |
| 2011/0099507 A1 | 4/2011 | Nesladek et al. |
| 2011/0102630 A1 | 5/2011 | Rukes |
| 2011/0119133 A1 | 5/2011 | Gelman et al. |
| 2011/0126253 A1 | 5/2011 | Roberts et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0244894 A1 | 10/2011 | Mahalingam |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0312307 A1 | 12/2011 | Gross |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0102123 A1 | 4/2012 | Tysk |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0246679 A1 | 9/2012 | Chen |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia |
| 2012/0278692 A1 | 11/2012 | Shi |
| 2012/0290637 A1 | 11/2012 | Perantatos et al. |
| 2012/0290666 A1 | 11/2012 | Fabre et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2012/0331568 A1 | 12/2012 | Weinstein |
| 2013/0006759 A1 | 1/2013 | Srivastava et al. |
| 2013/0024757 A1 | 1/2013 | Doll et al. |
| 2013/0035995 A1* | 2/2013 | Patterson ........... G06Q 30/0241 715/760 |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0066963 A1 | 3/2013 | Odio et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0088494 A1 | 4/2013 | Ortiz |
| 2013/0090171 A1 | 4/2013 | Holton et al. |
| 2013/0095857 A1 | 4/2013 | Garcia |

(56) References Cited

U.S. PATENT DOCUMENTS

| | | |
|---|---|---|
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0144674 A1 | 6/2013 | Kim et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0166385 A1 | 6/2013 | Russell |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198013 A1 | 8/2013 | Shehan et al. |
| 2013/0198176 A1 | 8/2013 | Kim |
| 2013/0212494 A1 | 8/2013 | Heiferman et al. |
| 2013/0218965 A1 | 8/2013 | Abrol et al. |
| 2013/0218968 A1 | 8/2013 | McEvilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0329060 A1 | 12/2013 | Yim |
| 2013/0332856 A1 | 12/2013 | Sanders et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0143434 A1 | 5/2014 | Sanche |
| 2014/0149519 A1 | 5/2014 | Redfern et al. |
| 2014/0155102 A1 | 6/2014 | Cooper et al. |
| 2014/0172856 A1 | 6/2014 | Imbruce et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0280566 A1 | 9/2014 | Chen |
| 2014/0282096 A1 | 9/2014 | Rubinstein |
| 2014/0287779 A1 | 9/2014 | O'Keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0379798 A1 | 12/2014 | Bunner et al. |
| 2015/0020086 A1 | 1/2015 | Chen et al. |
| 2015/0046278 A1 | 2/2015 | Pei et al. |
| 2015/0066614 A1 | 3/2015 | Gilmartin et al. |
| 2015/0071619 A1 | 3/2015 | Brough |
| 2015/0087263 A1 | 3/2015 | Branscomb |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0170045 A1 | 6/2015 | Kirkham et al. |
| 2015/0172534 A1 | 6/2015 | Miyakawa et al. |
| 2015/0178260 A1 | 6/2015 | Brunson |
| 2015/0180980 A1* | 6/2015 | Welinder ............... H04L 67/06 715/758 |
| 2015/0199082 A1 | 7/2015 | Scholler et al. |
| 2015/0222580 A1 | 8/2015 | Grue |
| 2015/0222814 A1 | 8/2015 | Li et al. |
| 2015/0227602 A1 | 8/2015 | Ramu et al. |
| 2015/0261917 A1 | 9/2015 | Smith |
| 2015/0269531 A1 | 9/2015 | Menayas et al. |
| 2015/0271126 A1 | 9/2015 | Menayas et al. |
| 2015/0271638 A1 | 9/2015 | Menayas et al. |
| 2015/0312184 A1 | 10/2015 | Langholz et al. |
| 2015/0324826 A1 | 11/2015 | Mizushima |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014059 A1 | 1/2016 | Rathod |
| 2016/0014063 A1 | 1/2016 | Hogeg et al. |
| 2016/0034827 A1 | 2/2016 | Morris |
| 2016/0044087 A1 | 2/2016 | Velummylum et al. |
| 2016/0049008 A1 | 2/2016 | Haddick et al. |
| 2016/0057156 A1 | 2/2016 | Lin et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0094961 A1 | 3/2016 | Agrawal |
| 2016/0099901 A1 | 4/2016 | Allen et al. |
| 2016/0148158 A1 | 5/2016 | Marth et al. |
| 2016/0180887 A1 | 6/2016 | Sehn |
| 2016/0182422 A1 | 6/2016 | Sehn |
| 2016/0182875 A1 | 6/2016 | Sehn |
| 2016/0191653 A1 | 6/2016 | Aluotto |
| 2016/0196239 A1 | 7/2016 | Liu et al. |
| 2016/0239248 A1 | 8/2016 | Sehn |
| 2016/0253833 A1 | 9/2016 | Lew |
| 2016/0261527 A1 | 9/2016 | Huang |
| 2016/0269675 A1 | 9/2016 | Tsujimoto |
| 2016/0277419 A1 | 9/2016 | Allen et al. |
| 2016/0302037 A1 | 10/2016 | Jack et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0006094 A1 | 1/2017 | Abou Mahmoud et al. |
| 2017/0024091 A1 | 1/2017 | Hosier, Jr. |
| 2017/0061308 A1 | 3/2017 | Chen et al. |
| 2017/0104712 A1 | 4/2017 | Cho et al. |
| 2017/0118034 A1 | 4/2017 | Soli |
| 2017/0124606 A1 | 5/2017 | Belle |
| 2017/0149699 A1 | 5/2017 | Hinson, Jr. |
| 2017/0161382 A1 | 6/2017 | Ouimet et al. |
| 2017/0161599 A1 | 6/2017 | Li et al. |
| 2017/0177607 A1 | 6/2017 | Fahey |

(56) References Cited

U.S. PATENT DOCUMENTS

| | | |
|---|---|---|
| 2017/0221095 A1 | 8/2017 | Gauglitz et al. |
| 2017/0263029 A1 | 9/2017 | Yan et al. |
| 2017/0279751 A1 | 9/2017 | Quirarte et al. |
| 2017/0286994 A1* | 10/2017 | Truong .............. G06Q 30/0601 |
| 2017/0287006 A1 | 10/2017 | Azmoodeh et al. |
| 2017/0295250 A1 | 10/2017 | Samaranayake et al. |
| 2017/0301043 A1 | 10/2017 | Soli |
| 2017/0351977 A1 | 12/2017 | Bijor |
| 2017/0357950 A1 | 12/2017 | Bennett et al. |
| 2017/0374003 A1 | 12/2017 | Allen et al. |
| 2017/0374508 A1 | 12/2017 | Davis et al. |
| 2018/0013861 A1 | 1/2018 | Howard et al. |
| 2018/0054487 A1 | 2/2018 | Hebsur et al. |
| 2018/0077542 A1 | 3/2018 | Xie et al. |
| 2018/0130138 A1 | 5/2018 | Kumar |
| 2018/0191831 A1 | 7/2018 | Wadley et al. |
| 2018/0227376 A1 | 8/2018 | Schneider et al. |
| 2018/0241705 A1 | 8/2018 | Sarafa et al. |
| 2018/0246623 A1 | 8/2018 | Peled et al. |
| 2018/0246983 A1 | 8/2018 | Rathod |
| 2018/0253901 A1 | 9/2018 | Charlton et al. |
| 2018/0329622 A1 | 11/2018 | Missig et al. |
| 2018/0332446 A1 | 11/2018 | Seidman |
| 2018/0336644 A1 | 11/2018 | Albertine et al. |
| 2018/0350144 A1 | 12/2018 | Rathod |
| 2018/0351888 A1 | 12/2018 | Howard |
| 2018/0351895 A1 | 12/2018 | Rathod |
| 2018/0357609 A1 | 12/2018 | Hwacinski et al. |
| 2019/0018848 A1 | 1/2019 | Lee |
| 2019/0052587 A1 | 2/2019 | Andreou et al. |
| 2019/0188752 A1 | 6/2019 | Jones |
| 2019/0199907 A1* | 6/2019 | Daulton ................ H04N 23/631 |
| 2019/0205841 A1 | 7/2019 | Burlin et al. |
| 2019/0287418 A1 | 9/2019 | Rabie |
| 2019/0333023 A1 | 10/2019 | Foran |
| 2019/0356620 A1 | 11/2019 | Presley et al. |
| 2019/0392399 A1 | 12/2019 | Horne |
| 2020/0112450 A1 | 4/2020 | Chhabra et al. |
| 2020/0117339 A1 | 4/2020 | Amitay et al. |
| 2020/0120170 A1 | 4/2020 | Amitay et al. |
| 2020/0177965 A1 | 6/2020 | Fawcett et al. |
| 2020/0184478 A1 | 6/2020 | Peled et al. |
| 2020/0193390 A1 | 6/2020 | Almanza Ahumada et al. |
| 2020/0314586 A1 | 10/2020 | Bouba et al. |
| 2020/0358728 A1 | 11/2020 | Andreou et al. |
| 2020/0382912 A1 | 12/2020 | Dancie et al. |
| 2020/0401225 A1 | 12/2020 | Jaureguiberry et al. |
| 2020/0410453 A1 | 12/2020 | Nalliah et al. |
| 2021/0006519 A1 | 1/2021 | Taitz et al. |
| 2021/0011612 A1 | 1/2021 | Dancie et al. |
| 2021/0042724 A1 | 2/2021 | Rathod |
| 2021/0152979 A1 | 5/2021 | Berardino et al. |
| 2021/0203522 A1 | 7/2021 | Kim et al. |
| 2021/0218571 A1 | 7/2021 | Ansari et al. |
| 2021/0226904 A1 | 7/2021 | Taitz et al. |
| 2021/0266704 A1 | 8/2021 | Dancie et al. |
| 2021/0286510 A1 | 9/2021 | Tyler et al. |
| 2021/0306288 A1 | 9/2021 | Boyd et al. |
| 2021/0336916 A1 | 10/2021 | Boyd et al. |
| 2021/0377693 A1 | 12/2021 | Bouba et al. |
| 2021/0409904 A1 | 12/2021 | Baylin et al. |
| 2022/0174455 A1 | 6/2022 | Guillaume |
| 2022/0179665 A1 | 6/2022 | Rathod |
| 2022/0269345 A1 | 8/2022 | Jaureguiberry et al. |
| 2022/0321506 A1 | 10/2022 | Taitz et al. |
| 2022/0377031 A1 | 11/2022 | Boyd et al. |
| 2023/0057193 A1 | 2/2023 | Andreou et al. |
| 2023/0308411 A1 | 9/2023 | Bai et al. |
| 2023/0318993 A1 | 10/2023 | Taitz et al. |
| 2023/0328014 A1 | 10/2023 | Andreou et al. |
| 2023/0396569 A1 | 12/2023 | Boyd et al. |
| 2023/0419566 A1 | 12/2023 | Bliss et al. |
| 2025/0023836 A1 | 1/2025 | Boyd et al. |

FOREIGN PATENT DOCUMENTS

| | | |
|---|---|---|
| CN | 1791070 A | 6/2006 |
| CN | 102082740 A | 6/2011 |
| CN | 103457994 A | 12/2013 |
| CN | 103702297 A | 4/2014 |
| CN | 104954402 A | 9/2015 |
| CN | 106789547 A | 5/2017 |
| CN | 106992921 A | 7/2017 |
| CN | 111133723 A | 5/2020 |
| CN | 116567556 A | 8/2023 |
| CN | 118922808 A | 11/2024 |
| CN | 119318137 A | 1/2025 |
| DE | 202016008173 U1 | 6/2017 |
| EP | 2051480 A1 | 4/2009 |
| EP | 2151797 A1 | 2/2010 |
| GB | 2399928 A | 9/2004 |
| KR | 19990073076 A | 10/1999 |
| KR | 20010078417 A | 8/2001 |
| KR | 101232229 B1 | 2/2013 |
| KR | 20190021973 A | 3/2019 |
| KR | 102236593 B1 | 4/2021 |
| KR | 102343824 B1 | 12/2021 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2013008238 A1 | 1/2013 |
| WO | WO-2013008251 A2 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | WO-2017106529 A1 | 6/2017 |
| WO | WO-2017176739 A1 | 10/2017 |
| WO | WO-2017176992 A1 | 10/2017 |
| WO | WO-2018005644 A1 | 1/2018 |
| WO | WO-2019032703 A1 | 2/2019 |
| WO | WO-2021205240 A1 | 10/2021 |
| WO | WO-2021216999 A1 | 10/2021 |
| WO | WO-2023183489 A1 | 9/2023 |
| WO | WO-2023235399 A1 | 12/2023 |

OTHER PUBLICATIONS

U.S. Appl. No. 18/903,829, filed Oct. 1, 2024, Off-Platform Messaging System.

"A Whole New Story", Snap, Inc., [Online] Retrieved from the Internet: <URL: https://www.snap.com/en-us/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 15/859,237, Final Office Action mailed Sep. 6, 2019", 12 pgs.

"U.S. Appl. No. 15/859,237, Non Final Office Action mailed Mar. 28, 2019", 11 pgs.

"U.S. Appl. No. 15/859,237, Notice of Allowability mailed Sep. 2, 2020", 2 pgs.

(56) References Cited

OTHER PUBLICATIONS

"U.S. Appl. No. 15/859,237, Notice of Allowance mailed Apr. 22, 2020", 5 pgs.
"U.S. Appl. No. 15/859,237, Response filed Feb. 3, 2020 to Final Office Action mailed Sep. 6, 2019", 9 pgs.
"U.S. Appl. No. 15/859,237, Response filed Aug. 28, 2019 to Non Final Office Action mailed Mar. 28, 2019", 9 pgs.
"U.S. Appl. No. 15/859,237, Supplemental Notice of Allowability mailed May 14, 2020", 2 pgs.
"U.S. Appl. No. 16/503,783, Corrected Notice of Allowability mailed Sep. 2, 2021", 2 pgs.
"U.S. Appl. No. 16/503,783, Non Final Office Action mailed Oct. 16, 2020", 16 pgs.
"U.S. Appl. No. 16/503,783, Notice of Allowance mailed Jan. 11, 2021", 11 pgs.
"U.S. Appl. No. 16/503,783, Notice of Allowance mailed May 27, 2021", 5 pgs.
"U.S. Appl. No. 16/503,783, Response filed Dec. 21, 2020 to Non Final Office Action mailed Oct. 16, 2020", 12 pgs.
"U.S. Appl. No. 16/835,080, 312 Amendment filed May 9, 2022", 8 pgs.
"U.S. Appl. No. 16/835,080, Corrected Notice of Allowability mailed Jul. 6, 2022", 2 pgs.
"U.S. Appl. No. 16/835,080, Examiner Interview Summary mailed Jan. 11, 2022", 3 pgs.
"U.S. Appl. No. 16/835,080, Non Final Office Action mailed Oct. 8, 2021", 12 pgs.
"U.S. Appl. No. 16/835,080, Notice of Allowance mailed Feb. 9, 2022", 9 pgs.
"U.S. Appl. No. 16/835,080, PTO Response to Rule 312 Communication mailed May 16, 2022", 2 pgs.
"U.S. Appl. No. 16/835,080, Response filed Jan. 10, 2022 to Non Final Office Action mailed Oct. 8, 2021", 12 pgs.
"U.S. Appl. No. 16/856,811, Final Office Action mailed Dec. 27, 2021", 21 pgs.
"U.S. Appl. No. 16/856,811, Non Final Office Action mailed May 11, 2022", 23 pgs.
"U.S. Appl. No. 16/856,811, Non Final Office Action mailed Jun. 9, 2021", 20 pgs.
"U.S. Appl. No. 16/856,811, Response filed Apr. 27, 2022 to Final Office Action mailed Dec. 27, 2021", 10 pgs.
"U.S. Appl. No. 16/856,811, Response filed Sep. 9, 2021 to Non Final Office Action mailed Jun. 9, 2021", 11 pgs.
"U.S. Appl. No. 16/942,061, Corrected Notice of Allowability mailed Sep. 1, 2023", 2 pgs.
"U.S. Appl. No. 16/942,061, Corrected Notice of Allowability mailed Oct. 25, 2023", 2 pgs.
"U.S. Appl. No. 16/942,061, Final Office Action mailed Jan. 5, 2023", 19 pgs.
"U.S. Appl. No. 16/942,061, Non Final Office Action mailed May 26, 2022", 16 pgs.
"U.S. Appl. No. 16/942,061, Notice of Allowability mailed Apr. 12, 2023", 2 pgs.
"U.S. Appl. No. 16/942,061, Notice of Allowability mailed Mar. 30, 2023", 5 pgs.
"U.S. Appl. No. 16/942,061, Preliminary Amendment filed Aug. 31, 2020", 7 pgs.
"U.S. Appl. No. 16/942,061, Response filed Mar. 3, 2023 to Final Office Action mailed Jan. 5, 2023", 10 pgs.
"U.S. Appl. No. 16/942,061, Response filed Sep. 23, 2022 to Non Final Office Action mailed May 26, 2022", 9 pgs.
"U.S. Appl. No. 17/222,247, Corrected Notice of Allowability mailed Jul. 7, 2022", 2 pgs.
"U.S. Appl. No. 17/222,247, Non Final Office Action mailed Jan. 5, 2022", 9 pgs.
"U.S. Appl. No. 17/222,247, Notice of Allowance mailed Apr. 12, 2022", 11 pgs.
"U.S. Appl. No. 17/222,247, Response filed Mar. 22, 2022 to Non Final Office Action mailed Jan. 5, 2022", 7 pgs.
"U.S. Appl. No. 17/818,268, Advisory Action mailed Jan. 25, 2024", 3 pgs.
"U.S. Appl. No. 17/818,268, Final Office Action mailed Nov. 8, 2023", 8 pgs.
"U.S. Appl. No. 17/818,268, Non Final Office Action mailed Mar. 6, 2024", 11 pgs.
"U.S. Appl. No. 17/818,268, Non Final Office Action mailed Jul. 25, 2023", 11 pgs.
"U.S. Appl. No. 17/818,268, Preliminary Amendment filed Oct. 6, 2022", 8 pgs.
"U.S. Appl. No. 17/818,268, Response filed Jan. 8, 2024 to Final Office Action mailed Nov. 8, 2023", 13 pgs.
"U.S. Appl. No. 17/818,268, Response filed Feb. 7, 2024 to Advisory Action mailed Jan. 25, 2024", 16 pgs.
"U.S. Appl. No. 17/818,268, Response filed Oct. 24, 2023 to Non Final Office Action mailed Jul. 25, 2023", 12 pgs.
"U.S. Appl. No. 17/843,858, Non Final Office Action mailed Jan. 5, 2023", 8 pgs.
"U.S. Appl. No. 17/843,858, Notice of Allowance mailed Mar. 17, 2023", 11 pgs.
"U.S. Appl. No. 17/843,858, Response filed Feb. 22, 2023 to Non Final Office Action mailed Jan. 5, 2023", 7 pgs.
"U.S. Appl. No. 18/132,267, Non Final Office Action mailed Sep. 14, 2023", 12 pgs.
"U.S. Appl. No. 18/132,267, Notice of Allowance mailed Dec. 27, 2023", 8 pgs.
"U.S. Appl. No. 18/132,267, Response filed Dec. 7, 2023 to Non Final Office Action mailed Sep. 14, 2023", 12 pgs.
"U.S. Appl. No. 18/204,203, Notice of Allowability mailed Dec. 20, 2023", 2 pgs.
"U.S. Appl. No. 18/204,203, Notice of Allowance mailed Nov. 15, 2023", 10 pgs.
"U.S. Appl. No. 18/205,246, Non Final Office Action mailed Oct. 27, 2023", 17 pgs.
"U.S. Appl. No. 18/205,246, Notice of Allowance mailed Dec. 27, 2023", 8 pgs.
"U.S. Appl. No. 18/205,246, Response filled Nov. 3, 2023 to Non Final Office Action mailed Oct. 27, 2023", 8 pgs.
"BlogStomp", StompSoftware, [Online] Retrieved from the Internet: <URL: http://stompsoftware.com/blogstomp>, (accessed May 24, 2017), 12 pgs.
"Chinese Application Serial No. 201880057966.5, Response filed May 7, 2022 to Office Action mailed Feb. 22, 2022", w/ English Claims, 9 pgs.
"Chinese Application Serial No. 201880057966.5, Decision of Rejection mailed Aug. 12, 2022" w/ English Translation, 14 pgs.
"Chinese Application Serial No. 201880057966.5, Office Action mailed Feb. 22, 2022", w/ English translation, 12 pgs.
"Chinese Application Serial No. 201880057966.5, Office Action mailed Jun. 28, 2021", w/ English Translation, 14 pgs.
"Chinese Application Serial No. 201880057966.5, Response filed Nov. 7, 2022 to Decision of Rejection mailed Aug. 12, 2022", w/ English Claims, 12 pgs.
"Chinese Application Serial No. 201880057966.5, Response filed Nov. 12, 2021 to Office Action mailed Jun. 28, 2021", w/ English Claims, 13 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (IOS/Android): Give Pictures a Sense of Place", TechPP, [Online] Retrieved from the Internet: <URL: http://techpp.com/2013/02/15/instaplace-app-review>, (2013), 13 pgs.
"European Application Serial No. 18842992.2, Communication Pursuant to Article 94(3) EPC mailed Aug. 4, 2021", 10 pgs.
"European Application Serial No. 18842992.2, Communication Pursuant to Article 94(3) EPC mailed Sep. 28, 2023", 13 pgs.
"European Application Serial No. 18842992.2, Extended European Search Report mailed Jul. 20, 2020", 10 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.

(56) References Cited

OTHER PUBLICATIONS

"International Application Serial No. PCT/US2015/037251, International Search Report malled Sep. 29, 2015", 2 pgs.
"International Application Serial No. PCT/US2018/045815, International Preliminary Report on Patentability mailed Feb. 20, 2020", 9 pgs.
"International Application Serial No. PCT/US2018/045815, International Search Report mailed Nov. 28, 2018", 3 pgs.
"International Application Serial No. PCT/US2018/045815, Written Opinion mailed Nov. 28, 2018", 7 pgs.
"International Application Serial No. PCT/US2021/028840, International Search Report malled Aug. 12, 2021", 3 pgs.
"International Application Serial No. PCT/US2021/028840, Written Opinion mailed Aug. 12, 2021", 4 pgs.
"International Application Serial No. PCT/US2023/016081, International Search Report mailed Jul. 17, 2023", 3 pgs.
"International Application Serial No. PCT/US2023/016081, Written Opinion mailed Jul. 17, 2023", 4 pgs.
"International Application Serial No. PCT/US2023/024011, International Search Report malled Sep. 25, 2023", 4 pgs.
"International Application Serial No. PCT/US2023/024011, Written Opinion mailed Sep. 25, 2023", 3 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2020-7006769, Notice of Preliminary Rejection mailed Apr. 2, 2021", w/ English Translation, 10 pgs.
"Korean Application Serial No. 10-2020-7006769, Response filed Jul. 8, 2021 to Notice of Preliminary Rejection mailed Apr. 2, 2021", w/ English Claims, 18 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Castelluccia, Claude, et al., "EphPub: Toward robust Ephemeral Publishing", 19TH IEEE International Conference on Network Protocols (ICNP), (Oct. 17, 2011), 18 pgs.
Christensson, Per, "Link Definition", TechTerms.com, [Online] Retrieved from the internet: <https://techterms.com/definition/link>, (Jun. 13, 2017), 2 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Fajman, "An Extensible Message Format for Message Disposition Notifications", Request for Comments: 2298, National Institutes of Health, (Mar. 1998), 28 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Sawers, Paul, "Snapchat for iOS Lets You Send Photos to Friends and Set How long They're Visible For", [Online] Retrieved from the Internet: <URL: https://thenextweb.com/news/snapchat-for-los-lets-you-send-photos-to-friends-and-set-how-long-theyre-visible-for>, (May 7, 2012), 5 pgs.
Shein, Esther, "Ephemeral Data", Communications of the ACM, vol. 56, No. 9, (Sep. 2013), 3 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.
"U.S. Appl. No. 17/818,268, Notice of Allowance mailed Jul. 3, 2024", 7 pgs.
"U.S. Appl. No. 17/818,268, Notice of Allowance mailed Oct. 23, 2024", 6 pgs.
"U.S. Appl. No. 17/818,268, Response filed Jun. 5, 2024 to Non Final Office Action mailed Mar. 6, 2024", 15 pgs.
"U.S. Appl. No. 18/132,267, Corrected Notice of Allowability mailed Apr. 2, 2024", 2 pgs.
"U.S. Appl. No. 18/204,203, Notice of Allowance mailed Apr. 11, 2024", 5 pgs.
"International Application Serial No. PCT/US2023/016081, International Preliminary Report on Patentability mailed Oct. 10, 2024", 6 pgs.
"International Application Serial No. PCT/US2023/024011, International Preliminary Report on Patentability mailed Dec. 12, 2024", 5 pgs.

(56) References Cited

OTHER PUBLICATIONS

"European Application Serial No. 23775662.2, Response to Communication pursuant to Rules 161(2) and 162 EPC filed Jan. 24, 2025", 16 pgs.

* cited by examiner

EXTERNAL MESSAGING FUNCTION FOR AN INTERACTION SYSTEM

CLAIM OF PRIORITY

This application is a continuation of U.S. application Ser. No. 18/132,267, filed on Apr. 7, 2023, which claims the benefit of priority to U.S. Provisional Application Ser. No. 63/348,412, filed on Jun. 2, 2022, which is incorporated herein by reference in its entirety.

TECHNICAL FIELD

The present disclosure relates generally to electronic messaging, and, more specifically, to an external messaging function for an interaction system.

BACKGROUND

The popularity of electronic messaging, particularly instant messaging, continues to grow. Users increasingly share media content items such as electronic images and videos with each other. Users also increasingly use their mobile devices to communicate with each other using interaction applications. In some cases, a user's contacts may not use the same interaction platform, e.g., messaging application, as the user. This may result in technical hurdles in respect of electronic communications between the user and one or more contacts.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
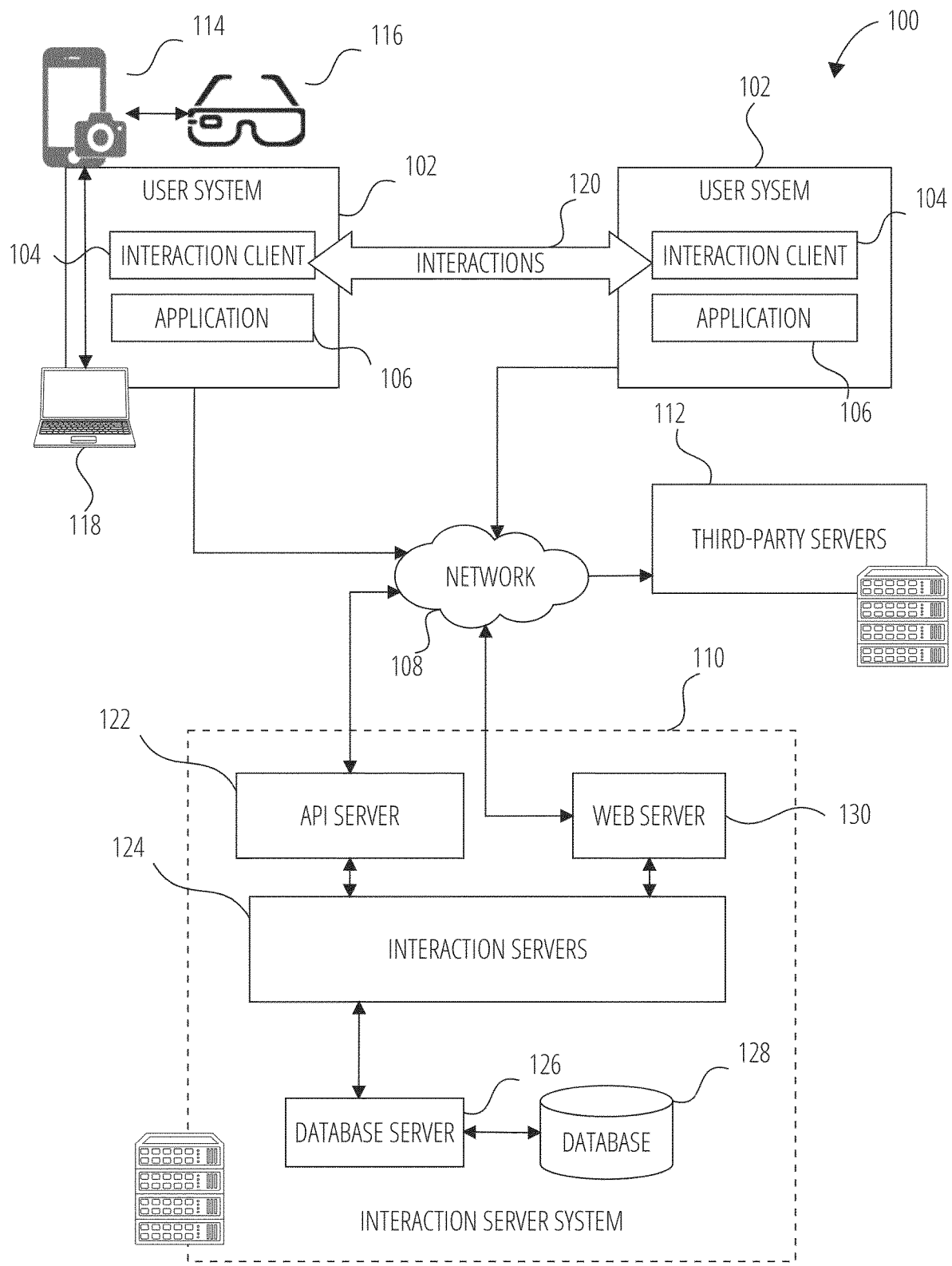
FIG. 1 is a diagrammatic representation of a networked environment in which the present disclosure may be deployed, according to some examples.

Examples of the present disclosure improve the functionality of electronic messaging software and systems by enhancing users' experience of using an interaction system. The users' experience of using an interaction system can be enhanced by enabling users to utilize external messaging functionality, also referred to as off-platform messaging functionality.

Examples described herein enable a user of an interaction system to initiate an interaction with a non-user via a user interface. The non-user (recipient) receives an off-platform communication, e.g., a notification in the form of a Short Message Service (SMS) message, with a link to register with the interaction system and thereby to enable accessing of a content item shared by the user. The off-platform message may be sent to the non-user using an off-platform contact record for the non-user (e.g., a phone number or other off-platform recipient identifier). Access to the content item shared with the recipient by the user (sender) may be dependent on the recipient registering with the interaction system using the off-platform contact record specified by the sender.

In addition to initiating the interaction with the non-user, the interaction system may generate a pending relationship request (e.g., friend request) associated with the user and the non-user. Once the non-user registers with the interaction system, the pending relationship request may be automatically surfaced and/or converted to an on-platform relationship or to an active relationship request, thereby facilitating the establishment of relationships within the interaction system.

In some examples, where a non-user receives multiple off-platform messages from different users of the interaction system, relationship establishment is treated differently depending on which off-platform message (e.g., registration link) is utilized by the non-user for platform on-boarding. In other words, establishing the relationship between a first platform account of the sender and a second, newly created platform account of the recipient may be based on whether the registration link in the sender's off-platform communication was used in an electronic account registration process for the second platform account. If the sender's registration link was used, a bidirectional relationship may automatically be established, while if it is detected that the sender's registration link was not used by the recipient, a one-directional relationship may automatically be established.

Further, in some examples, in response to transmission of the off-platform communication, a pending or queued message may be generated within the interaction system, including the content item shared by the sender. Once the recipient registers with the interaction system, the pending message may be automatically surfaced and presented to the recipient in a chat or message feed interface, thereby facilitating viewing of the content item and further on-platform interactions between the users.

In some examples, a sender uses a first user device to request sending, via an interaction application, of a content item to a recipient identified by a recipient identifier (e.g., a phone number). The interaction system maintains first electronic contact data for a plurality of users of the interaction system. Each user of the interaction system has a platform account. The interaction system further has access to second electronic contact data associated with an external application of the sender. The second electronic contact data includes the recipient identifier. The interaction system determines that the recipient identifier is not linked to a platform account forming part of the first electronic contact data. The external application may be a contacts application distinct from the interaction application.

The interaction system causes presentation of the recipient identifier in a contact list. Such presentation may be in response to determining that the recipient identifier is not linked to a platform account forming part of the first electronic contact data. The recipient identifier may be presented together with a user-selectable off-platform messaging selector. The contact list may be presented to the sender via a user interface provided by the interaction application.

The recipient may receive an off-platform communication including a user-selectable registration link. In some examples, the off-platform communication does not include the content item, and the content item only becomes accessible by the recipient subsequent to establishment of the second platform account linked to the recipient identifier. In response to receiving a user selection of the registration link, the interaction system may initiate an electronic account registration process.

The recipient may utilize the account registration process to establish the second platform account linked to the recipient identifier. The interaction system may detect accessing of the interaction application by the recipient using the second platform account and, in response thereto, cause presentation of a message from the sender via a user interface provided by the interaction application. The message may be presented on a second user device of the recipient. The message may include the content item, thereby enabling the recipient to access the content item after registration.

In some examples, the message is designated as a pending message prior to establishment of the second platform account linked to the recipient identifier and is made available to the recipient in response to the detecting of establishment of the second platform account. In some examples, the interaction system automatically converts a pending relationship request to an active relationship request in response to detecting of the establishment of the second platform account linked to the recipient identifier. The active relationship request may be a request to establish a bidirectional relationship between the sender and the recipient in the context of the interaction system.

In some examples, a one-directional relationship is initially established between the sender and the recipient. Subsequent to establishing the one-directional relationship, the recipient may select a user-selectable relationship establishment element (e.g., an "add" button or "add friend" button). In response to receiving the selection of the user-selectable relationship establishment element, the interaction system may automatically convert the one-directional relationship to a bidirectional relationship.

Enabling the recipient to access the content item on the second user device may comprise presenting, via the interaction application, a messaging user interface including a mechanism to establish the bidirectional relationship with the sender in the context of the interaction system.

In some examples, in response to detecting of the establishment of the second platform account by the recipient, the interaction system causes presentation, on the second user device of the recipient, e.g., via a user interface provided by the interaction application, of a user suggestion. The user suggestion includes profile data of the sender and is indicative of an option to establish the bidirectional relationship with the sender.

Networked Computing Environment

FIG. 1 is a block diagram showing an example interaction system 100 for facilitating interactions (e.g., exchanging text messages, conducting text, audio and video calls, or playing games) over a network. The interaction system 100 includes multiple user systems 102, each of which hosts multiple applications, including an interaction client 104 (as an example of an interaction application) and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the client systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
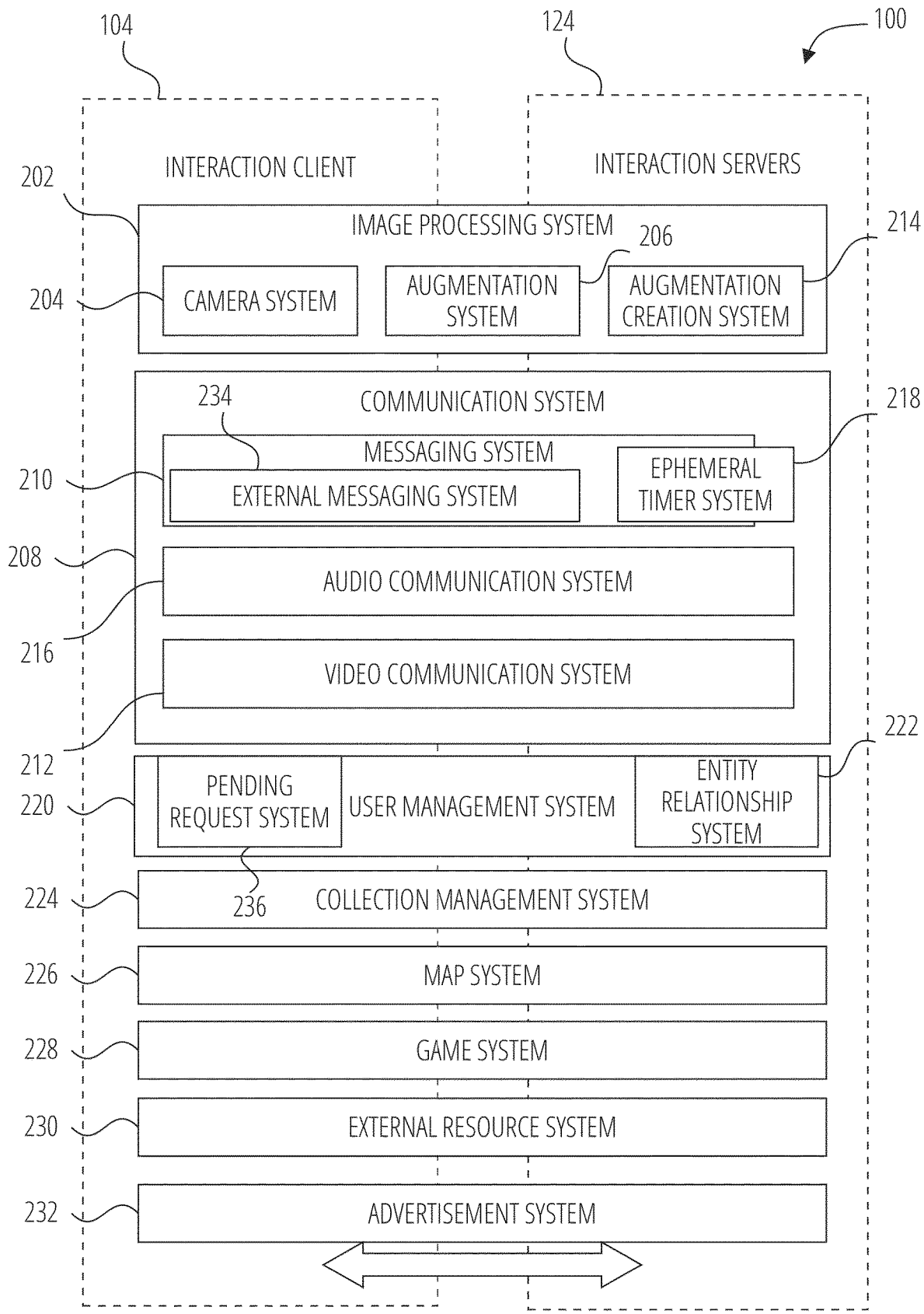
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1402 of a user system 102. These augmentations are selected by the augmentation system 206 and presented to a user of an interaction client 104, based on a number of inputs and data, such as for example:

Geolocation of the user system 102; and
Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212.

The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

The messaging system 210 includes an external messaging system 234. The external messaging system 234 is responsible for causing transmission of off-platform messages. For example, a user may elect to send a particular content item to an off-platform destination (e.g., to a third-party messaging application or as a link via SMS message). The external messaging system 234 may enable the user to be presented with off-platform sharing options, such as a list of non-users of the interaction system 100 located in the user's contacts application and accessible to the external messaging system 234, thereby permitting the user to select a non-user to whom to send an off-platform message.

A user management system 220 is operationally responsible for the management of user data and profiles, and includes an entity relationship system 222 that maintains information regarding relationships between users of the interaction system 100. In addition, in some examples, the user management system 220 includes a pending request system 236 that is responsible for the management of "pending" relationship requests, including those involving non-users of the interaction system 100. For example, where a first user has initiated an off-platform interaction with a non-user, a pending relationship request may be recorded in the interaction system 100 by the pending request system 236 such that, once the non-user signs up or registers with the interaction system 100, the relationship request is surfaced on the new user's mobile device 114. If approved by the new user (previously a non-user), a bidirectional relationship may be established between the first user and the new user and recorded in the user management system 220.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
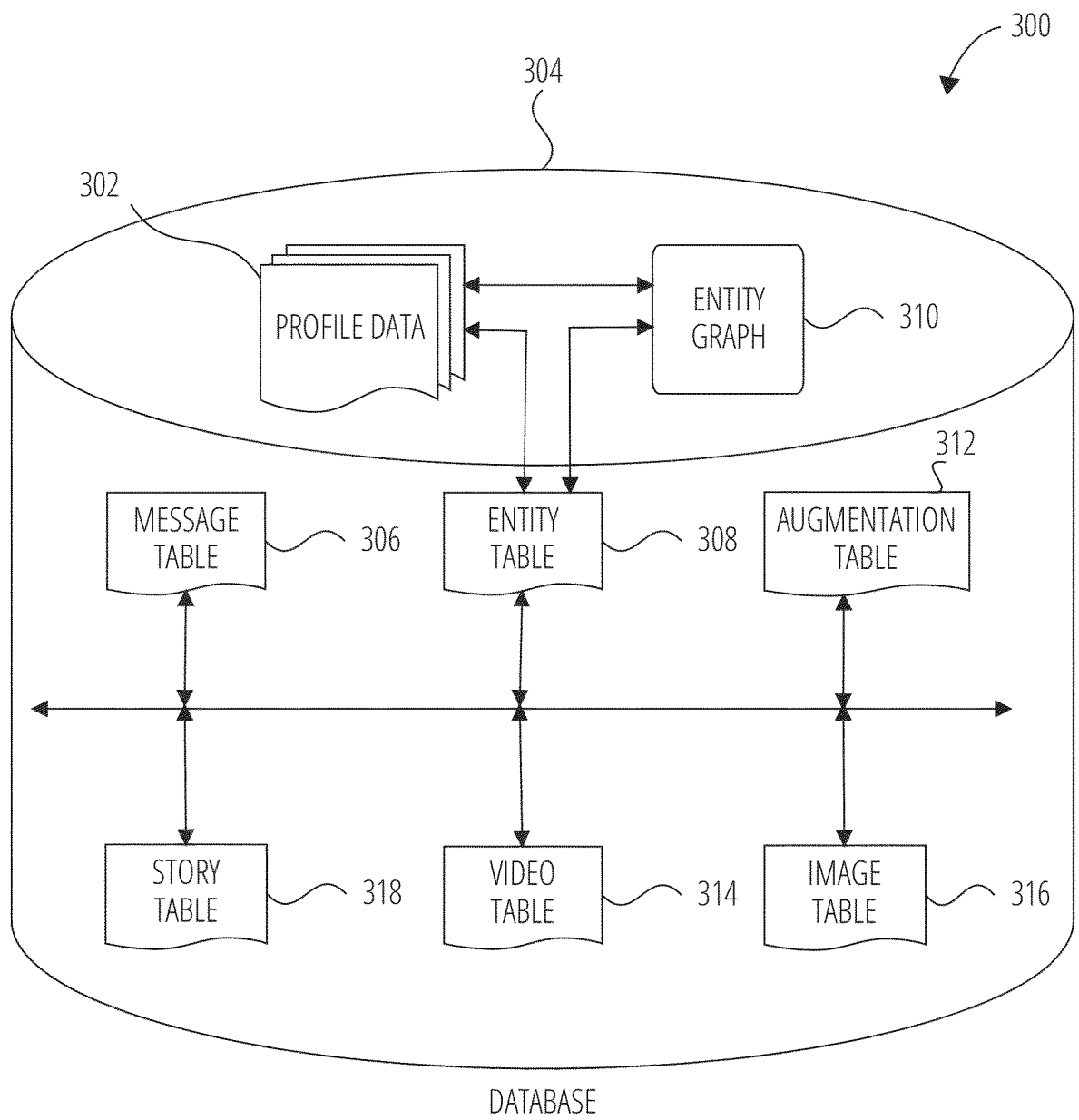
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 13.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown). The entity table 308 may include data relating to registered users and non-users. For example, where a registered user has sent an off-platform message to a non-user via SMS, the entity table 308 may store the phone number and other details of the non-user.

The entity graph 310 stores information regarding relationships and associations between entities. Such relationships may be social, professional (e.g., work at a common corporation or organization), interest-based, or activity-based, merely for example. Certain relationships between entities may be one direction, such as subscription by an individual user to digital content of a commercial or publishing user, such as a newspaper or other digital media outlet, or a brand). Other relationships may be bidirectional, such as a "friend" relationship between individual users of the interaction system 100. Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restriction on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to only certain types of relationships.

The entity graph 310, in some examples, stores information regarding relationships and/or associations between registered users and non-users of the interaction system 100. For example, a registered user may initiate an off-platform interaction with a non-user identified by an off-platform contact record (e.g., phone number). The pending request system 236 may cause generation of a pending relationship request even though the non-user is not yet registered with the interaction system 100. In line with this generation of the pending relationship request, the entity graph 310 may store information indicative of the pending transmission or surfacing of a relationship request.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire statespace of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, a computer animation model to transform image data can be used by a system where a user may capture an image or video stream of the user (e.g., a selfie) using the user system 102 having a neural network operating as part of an interaction client 104 operating on the user system 102. The transformation system operating within the interaction client 104 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the user system 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Figure 4:
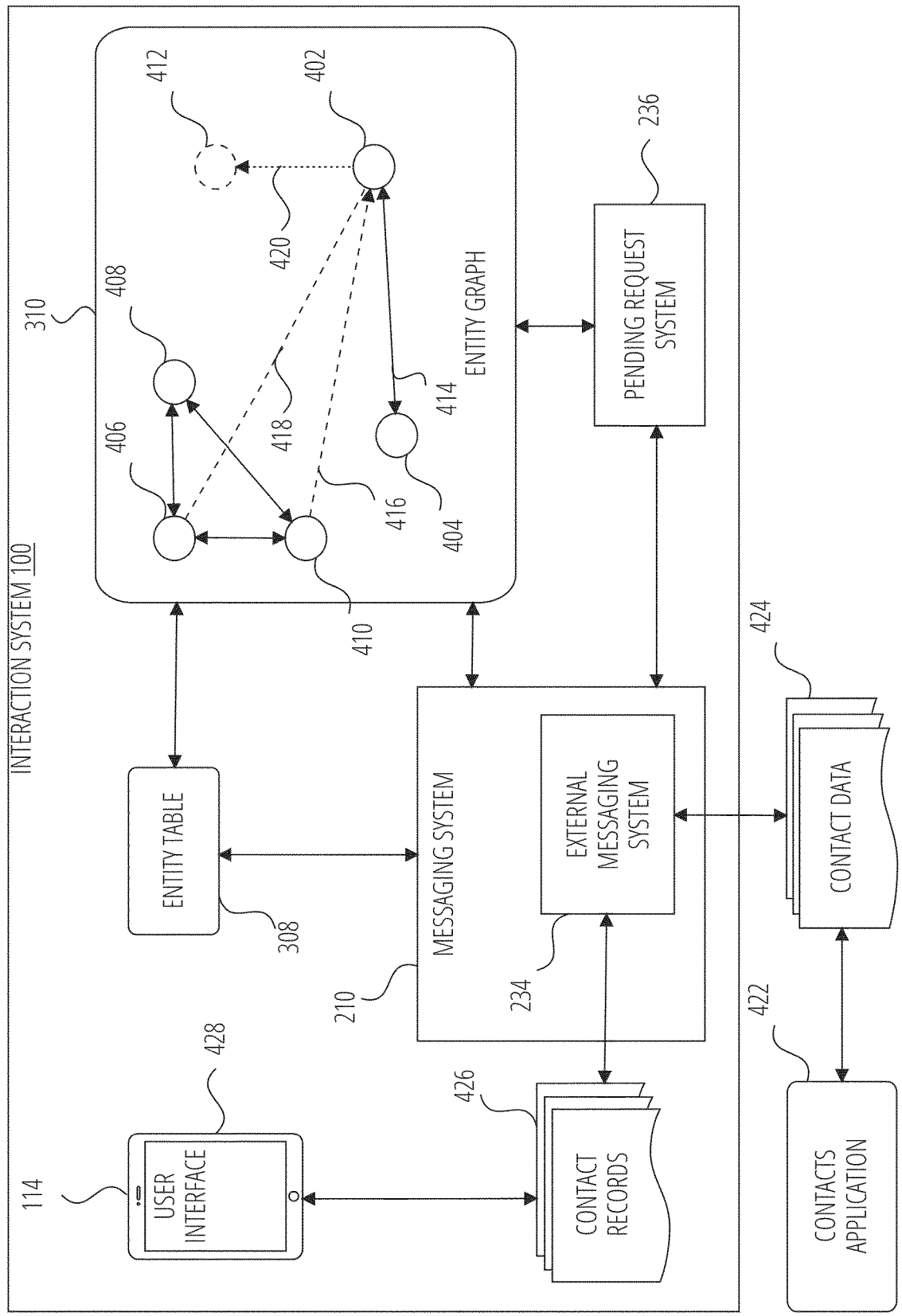
FIG. 4 is a relationship diagram, showing details regarding various data structures and interactions of an interaction system, according to some examples.

FIG. 4 is a relationship diagram, showing further details regarding various data structures and interactions of the interaction system 100 shown in FIG. 1. As described with reference to FIG. 3, the interaction system 100 maintains an entity table 308 of data or records for entities (e.g., registered users and certain non-users with which registered users have interacted), as well as an entity graph 310, which stores the details of relationships between these various entities. FIG. 4 shows further details of relationships between example entities in the form of users of the interaction system 100, as well as a non-user not yet registered with the interaction system 100. These relationships are recorded as relationship data stored within the database 128 of the interaction server system 110.

The entity graph 310 shows a user 402 having a bidirectional relationship 414 with another user 404, a one-directional relationship 416 with user 410, and no direct relationship 418 with another user 406. Various other relationships between users 402, 404, 406, 408 and 410 are also reflected.

A one-directional relationship, such as the one-directional relationship 416 between the user 402 and the user 410 may result from the user 410 sending a relationship request (e.g., a request to add the non-user 412 as a friend) to the user 402. As the user 402 may not have accepted that relationship request yet, the relationship is regarded as a one-directional relationship 416, in some examples. In some examples, the user 410 may have selected to "follow" the user 402 while the user 402 has not reciprocated, thus defining a one-directional relationship 416. On the other hand, the user 402 has a bidirectional relationship 414 with the user 404, as a result of, in some examples, one of these parties having extended an invitation to a relationship to the other, and the other having accepted that invitation to establish the bidirectional relationship 414.

As a result of the establishment of a relationship, as recorded with the entity graph 310 as a one-directional or a bidirectional relationship, certain automated information sharing may occur within the context of the interaction system 100 as a result of the establishment of that relationship. For example, information regarding one entity (e.g., the user 402) may be shared according to the direction of the relationship. Where a one-directional relationship exists, information may be shared in the direction of that relationship. Where a bidirectional relationship exists, information sharing may be mutual and occur in both directions between the entities. The shared information may include, for example, content that has been generated or shared by a user, geolocation information regarding the user, and certain profile or personal information. As part of a bidirectional relationship, the interaction system 100 may thus automatically share user-generated content and/or other data between the two users in the relationship, that would not be shared in the absence of such a relationship.

Privacy settings and systems provided by the interaction system 100 and any particular entity, such as the user 402, may specify which information is shared under each of a one-directional relationship or a bidirectional relationship with other entities. Privacy settings may also determine the type and extent of information shared, depending upon a classification, by the relevant entity, of the relationship type with another entity. For example, privacy settings may determine whether a user can receive a message from another user if the two users have no direct relationship, or if the users only have a one-directional relationship.

In addition to the abovementioned relationships, in some examples, a user (an entity with a registered platform account within the interaction system 100) can initiate an off-platform communication with a non-user (an entity with no registered platform account within the interaction system 100). For example, the user 402 may use the interaction system 100 to send a message to a non-user 412 via SMS, containing a registration link and/or a link to a content item shared via the interaction system 100, as well as information identifying the user 402. The SMS may be sent to a phone number of the non-user 412. A pending relationship request may be created, indicated in the entity graph 310 as a pending relationship 420 between the user 402 and the non-user 412. As the non-user 412 has not joined the interaction system 100 yet, no user-to-user relationship can be established and thus the association between them is regarded as a pending relationship 420.

If the non-user 412 does subsequently join the interaction system 100, the relationship request may be surfaced and presented, and the pending relationship 420 may be updated to a one-directional relationship, indicating that the user 402 has requested to add the non-user 412 (then a new user) as a friend, or to a bidirectional relationship if the non-user 412 (then the new user) joins the interaction system 100 and accepts the surfaced request. In some examples, e.g., where the non-user 412 uses the registration link originating from the user 402 to perform or access an electronic account registration process and registers a platform account linked to the phone number associated with the original invitation, a bidirectional relationship may automatically be established by the interaction system 100 without any further action being required by the users.

Additionally, or alternatively, the content item shared via the interaction system 100 may be stored within the interaction system 100 as a pending or queued message. As the non-user 412 has not joined the interaction system 100 yet, sharing of the content item may remain "pending" or "queued" until the non-user 412 becomes a registered user. If the non-user 412 joins the interaction system 100, the content item may be surfaced and presented as an on-platform message. Accordingly, in some examples, the non-user 412 may be required to register a platform account with the interaction system 100 (and install or access the interaction client 104 via the platform account) in order to access the content item shared by the user 402. In some examples, the registered platform account must be linked to the recipient identifier (e.g., phone number) the content item was originally addressed to by the sender.

The messaging system 210 of the interaction system 100 has access to the entity table 308 and the entity graph 310, allowing users to share content along the defined relationship lines, e.g., send messages to "friends."

It will be appreciated that a user system 102, in addition to hosting the interaction client 104, may host a number of further applications 106. Examples of such applications are described with respect to FIG. 16, for example, as the applications 1620. One such application may be a contact management application in the example form of contacts application 422 (other examples may include a third-party communication application, such as a third-party messaging application or a third-party email application). The contacts application 422 maintains a set of electronic contact data 424 that may be accessible, as shown in FIG. 4, by the external messaging system 234.

The interaction system 100 maintains its own set of contact information as stored within the entity table 308 and the entity graph 310, relating to registered users of the interaction system 100. The external messaging system 234 can access the contact data 424 to enable a set of contact records 426 to be presented to the relevant user, allowing the user to initiate off-platform interactions as described herein. The external messaging system 234 may access or receive contact data stored by any suitable external application, such as the contact data 424 maintained by the contacts application 422. The interaction system 100 may supplement and present the contact records 426 within various user interfaces presented by the interaction client 104, e.g., the user interface 428 shown in FIG. 4 as being presented on the mobile device 114 of FIG. 1. For example, the contact records 426 may be displayed as a contact list that includes contact details for registered users and non-users, where the interaction system 100 located contact details for those non-users via the external contacts application 422. Once a user has initiated an off-platform interaction, the pending request system 236 may cause establishment of a pending relationship request, e.g., as described above with reference to the user 402 and the non-user 412.

Accordingly, the interaction system 100 may maintain first electronic contact data that includes contact data for the users of the interaction system 100 holding platform accounts. The interaction system 100 may further access second electronic contact data, e.g., from an external application such as the contacts application 422 via the external messaging system 234. The interaction system 100 may determine a recipient identifier (e.g., phone number) for the user 402 from the second electronic contact data and determine that the recipient identifier is not present in the first electronic contact data, e.g., not linked to a platform account. As a result, the interaction system 100 may detect that a message addressed to the user 402 is to be sent as an off-platform communication.

FIG. 5 to FIG. 11 below illustrate user interfaces according to some examples. These user interfaces may be presented by an interaction client 104, as an example form of an interaction application, executing on a mobile device 114. While the user interfaces are described and/or depicted as being presented on the screen of a mobile device 114, the user interfaces may also be presented on other suitable devices, such as the optical display of a head-wearable apparatus 116 or other wearable apparatus presenting a user interface, e.g., "smart contact lenses" or similar technology.

The interaction system 100 allows users of the interaction system 100 to share and publish digital content, including various content items. Content items may comprise user-selected content items or data, user-generated content items or data, computer-generated content items (which may be computer-generated content data, e.g., data generated by an artificial intelligence driven system), or combinations thereof. A content item presented via such a user interface may be part of a collection of content items generated and published by a user of the interaction system 100. The content item may, for example, comprise image data, video data, audio data, or a combination of these data types, together with augmentation or modification data (e.g., overlays, stickers, filters or augmented reality effects).

Figure 5:
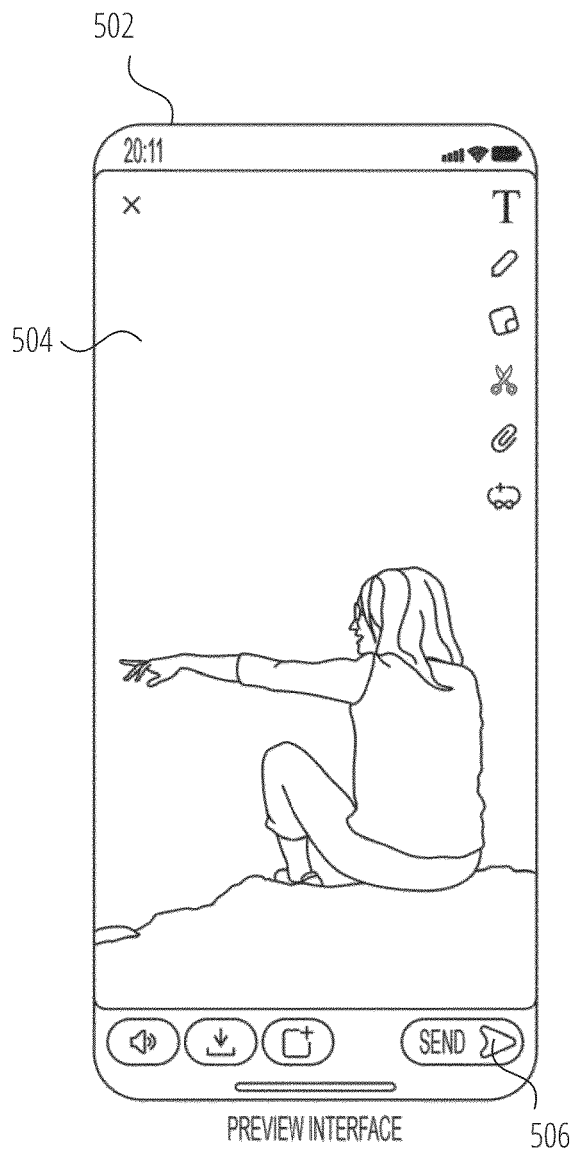
FIG. 5 is a user interface diagram showing a preview interface according to some examples.
Figure 6:
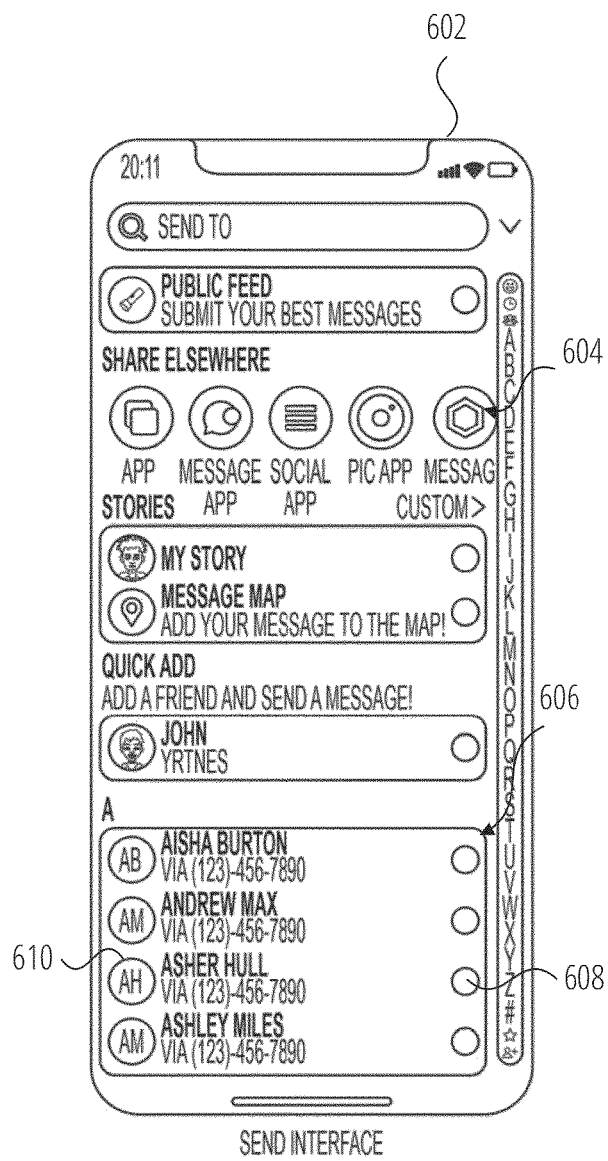
FIG. 6 is a user interface diagram showing a send interface according to some examples.

FIG. 5 and FIG. 6 are user interface diagrams showing a preview interface 502 and a send interface 602 respectively, according to some examples, as may be presented to an active user of the interaction system 100 on the mobile device 114, and more specifically by the interaction client 104. The active user (also referred to as the sender in this context) uses the interaction client 104 to create, share and interact with content items and other users. The active user is a registered user holding a platform account with the interaction system 100.

Within the preview interface 502, a digital content item 504 (e.g., an image or video) captured by the active user is displayed. As mentioned above, the active user may add various overlays, augmentations, or the like to the content item 504. A send button 506 is user-selectable to enable the active user to communicate (e.g., transmit or publish) the content item 504 to a recipient (or multiple recipients) who may or may not be a registered user of the interaction system 100. In other words, the send button 506 can be used to initiate sharing or interaction with both users (with registered platform accounts) and non-users (not holding registered platform accounts).

User selection of the send button 506 causes presentation, by the interaction client 104, of the send interface 602 that presents a number of recipient or destination selectors for a message that includes the content item 504. The destination selectors include a first set of off-platform send options 604, as well as a second set of options in the example form of a list of contacts presented within a contact list 606. The first set of off-platform send options 604 may include, for example, third party applications through which the active user can share the send button 506 (as opposed to sharing it within the interaction system 100 itself). The contact list 606 includes both off-platform send options and on-platform send options, as will be described below. Accordingly, the send interface 602 allows the sender to select off-platform messaging selectors and/or on-platform messaging selectors to identify destinations or recipients for the content item 504 to be shared by the sender.

As described above, the entity table 308 of the database 304 stores records for entities that may or may not be registered users of the interaction system 100. Furthermore, the interaction client 104 has access to a local address book, e.g., maintained by the contacts application 422 or the contacts application 1602. According to some examples, the contact list 606 may include a list of entities that are both registered users of the interaction system 100, as reflected in the entity table 308, as well as entities that appear in a locally-stored address book maintained by a contacts application (e.g., address book) of the mobile device 114.

Within the contact list 606, contact identifier information is shown for each user, including one or more of an avatar, a username, an interaction system handle, and a mobile device number. For the active user of FIG. 6, the contact list 606 includes details of non-users located in the contacts application 422 of the active user. For example, the contact list 606 includes an off-platform messaging selection in the example form of a destination selector 608 in a cell identifying a non-user 610. The non-user 610 is not a registered user of the interaction system 100, but the interaction client 104 enables the active user to initiate an interaction with the non-user 610 through selection of the destination selector 608. The non-user 610 thus does not have an avatar or interaction system handle, and the interaction client 104 instead displays the username as reflected in the contacts application 422 together with the mobile number of the non-user 610 as obtained from the contacts application 422.

Figure 7:
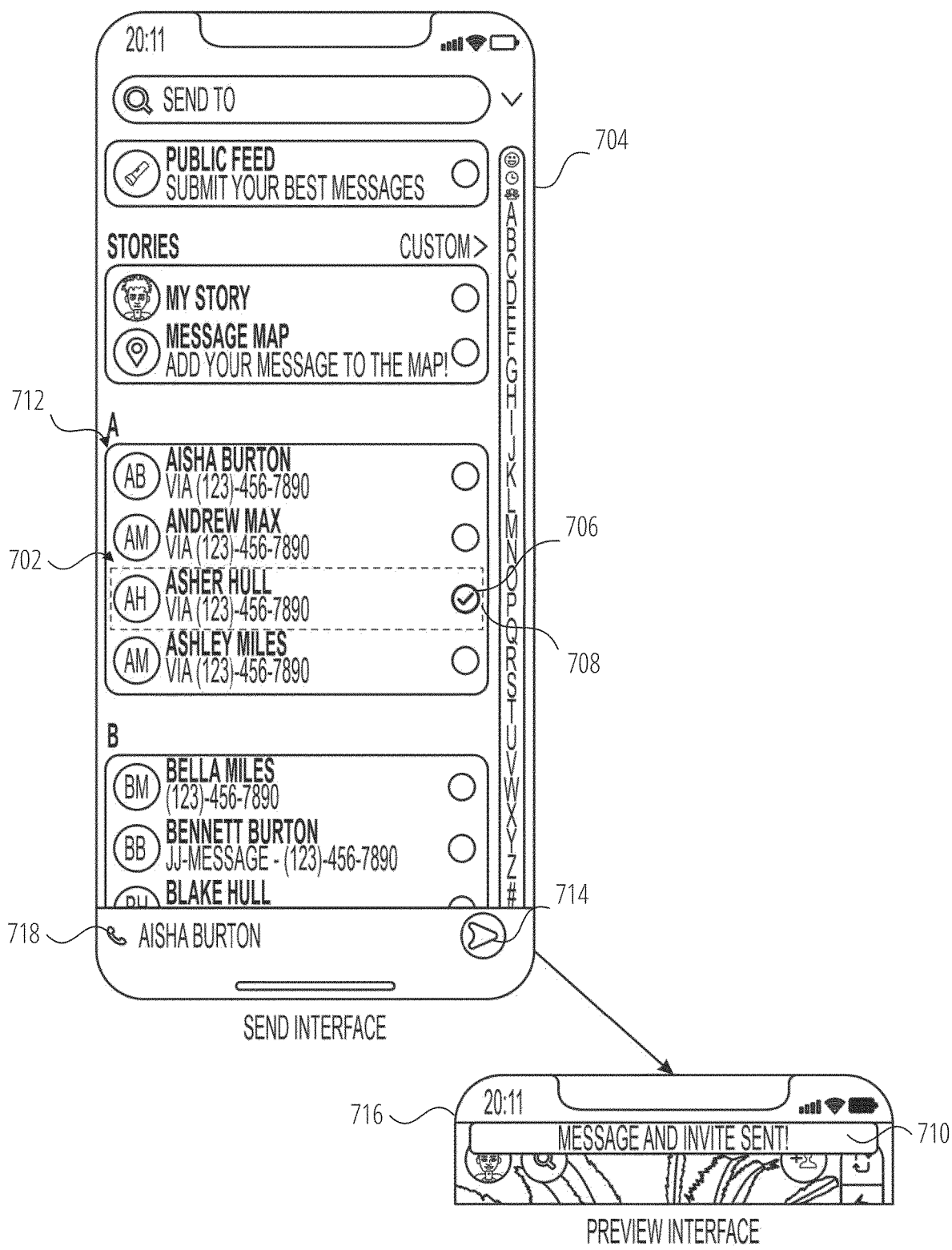
FIG. 7 is a user interface diagram showing a send interface, together with part of a preview interface, according to some examples.

FIG. 7 is a user interface diagram showing a send interface 704, according to some examples. A sender-side experience of the active user of the interaction client 104 will be described with reference to FIG. 7.

As noted with respect to FIG. 6, a contact list 712 within the send interface 704 may include contact data 702 for each listed contact. A destination selector, or "send to" selector 706, is shown for each contact, in association with the contact data 702 (e.g., the contact data 702 and the selector 706 are shown within a common selector bar 708 or cell). The selector 706 is user-selectable to select a particular contact as a recipient of a message including the content item 504.

In some examples, the interaction system 100 performs a phone verification process (also referred to as a contact number verification process) with respect to the active user of the interaction system 100 before including contact data 702 for contacts that are listed in the locally stored address book (e.g., contacts application 422 or contacts application 1602) of the active user within the contact list 712. If the active user of the interaction client 104 is not a phone-verified user, and is recorded as such within the entity table 308, contacts that appear only in the locally stored address book and are not registered users of the interaction system 100 are excluded from the contact list 712. However, in the examples described with reference to FIG. 5 to FIG. 7, the active sending user is phone-verified and thus the contact list 712 includes the contacts that appear only in the locally stored address book and are not registered users (as well as contacts that are both in the locally stored address book and are registered users, e.g., the contact "Bennett Burton," identified in FIG. 7 by an interaction system 100 handle ("JJ-Message") and a phone number).

Within the contact list 712, the contact data 702 of users that are not registered users of the interaction system 100 includes only a mobile phone number and not an interaction system handle that is specific to the interaction system 100. It is noted that the contact data 702 also specifically identifies that any communications with the relevant contact is via SMS or a messaging service external to the interaction system 100. In other words, the contact data 702 indicates to the active user that any communication with the relevant contact would occur via an off-platform communication. Accordingly, for the selected contact (e.g., "Asher Hull"), the subtext below the name indicates "via SMS [phone number]."

In some examples, the contact list 712 may be populated in the send interface 704 using both locally-stored and server-side contact information. For example, the interaction client 104 may obtain contact information relating to registered users from the database 128 stored at the interaction server system 110, and inject locally-stored contacts from the contacts application 422 on the mobile device 114 into the contact list 712, thereby to create a combined list of contact identifiers.

In some examples, the contact list 712 is locally stored on the mobile device 114 and is periodically updated by the interaction system 100, e.g., as details of registered users change over time. The contact list 712 is also updated if the active user updates the contacts application 422 on the mobile device 114, e.g., to add a new contact who is not a registered user of the interaction system 100. In this way, the interaction client 104 may ensure that an up-to-date version of the active user's contacts (both users and non-users) are presented when the active user wishes to share content.

As shown in FIG. 7, a particular contact, "Asher Hull," is selected as a recipient of a message within the send interface 704 by user selection of the selector 706. Responsive to this selection, the recipient name 718 appears adjacent to the send button 714 at the bottom of the send interface 704.

In the event that the selected recipient (e.g., "Asher Hull") is a first-time recipient of a message from the active user from within the interaction client 104, a message prompt (not shown) may be presented to the active user, advising the active user that the recipient will be invited to register as a user of the interaction system 100, and also to establish a bidirectional relationship (e.g., a "friend" relationship) with the active user that is recorded in the entity graph 310. The prompt may also advise the active sending user that the recipient will not be able to view the message and the content item 504 until registered with the interaction system 100.

In some examples, by selecting a "send to contact" option that results in an off-platform invitation, the sending user also opts to add the person associated with the relevant recipient identifier (e.g., phone number) as a friend. This establishes a one-directional relationship or bidirectional relationship with the recipient once the recipient joins the interaction system 100, as described further below.

Responsive to the user selection of the send button 714, the selected recipient (e.g., "Asher Hull") is sent a text message (e.g., an SMS message). The text message may be sent via the interaction system 100 or may be sent via a third-party messaging service, e.g., the external messaging system 234 may transmit an instruction to a messaging service to generate and/or deliver the message. Thereafter, the active user is returned to a preview interface 716 (partially shown in FIG. 7), where a drop-down text box 710 confirms that the digital content item 504, and an invitation to register as a user of the interaction system 100, have been sent to the selected recipient. The drop-down text box 710 is displayed as a brief notification if the selected recipient is not a registered user within the interaction system 100, or does not have an existing platform account linked to their phone number. For example, the recipient may have a platform account, but the phone number in the sender's contacts application may not be linked to that platform account, thus necessitating the off-platform communication.

On the other hand, if any one of a group of selected recipients is a registered user of the interaction system 100, the drop-down text box 710 may be presented in the chat interface, with the selector bar 708 for existing registered users showing a send status for the relevant message.

The active user may thus select multiple recipients, including both users and non-users. For users of the interaction system 100, the message is transmitted "on platform," meaning that the message is shared or transmitted within the interaction system 100 and accessible by the users via the interaction clients 104 linked to their platform accounts. For non-users, an off-platform communication is transmitted, as described above, given that a non-user does not yet have a platform account with the interaction system 100 (off-platform messages may also be employed for a recipient whose phone number is not linked, as explained above).

Figure 8:
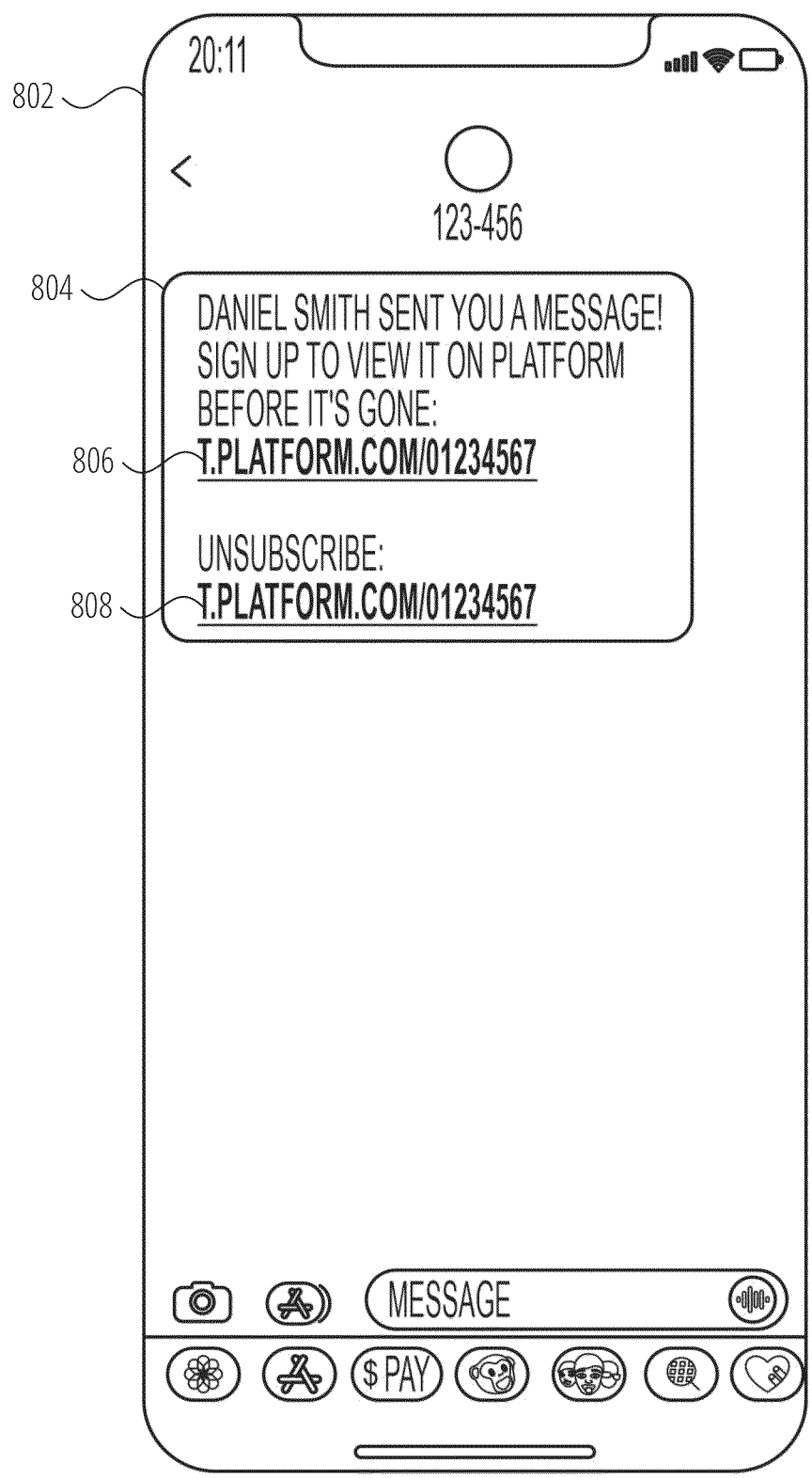
FIG. 8 is a user interface diagram showing a text message interface according to some examples.

FIG. 8 is a text message interface 802, according to some examples, displaying a text message 804. The text message 804 is, as noted above, sent responsive to user selection, by the sending user, of the send button 714 within the send interface 704.

The text message 804 includes text advising the recipient (non-user) of the name of the sending user and an invitation to view the message, including the digital content item 504. The invitation indicates that the recipient will be required to "sign up to view it." In other words, the off-platform communication sent to the non-user does not include the content item shown in FIG. 5, but informs the non-user that it can be viewed by joining the interaction platform provided by the interaction system 100.

The invitation to view the message includes a link in the example form of a URL that is user-selectable to direct the recipient (1) in the case where the recipient has not installed the interaction client 104 on a mobile device, to a web profile page (e.g., served via the web server 130 of the interaction system 100) of the sending user, or to an application store to allow the recipient to download the interaction client 104 (or to an application marketplace, or other digital distribution platform for applications) to view an in-application user profile interface, or (2) in the case where the recipient has already installed the interaction client 104, to the in-application user profile interface of the interaction client 104.

The web profile page or the in-applications user profile interface may include an invitation to the recipient user to register with the interaction system 100 via a registration service, where the user is guided through an electronic account registration process and thereafter able to review the message including the digital content item 504, as well as, in some examples, review the relationship request that remains pending while the user does not have a registered platform account, or in other examples, reciprocate a one-directional relationship established through the recipient's account registration.

Referring back to FIG. 8, the URL is time-limited and is only valid for a determinable amount of time (e.g., two days or thirty days). In some examples, the validity of the initial message selected to be shared by the sending user (e.g., the underlying content item) is linked to the validity of the URL. For example, if the URL expires without having been accessed by the non-user and used to register with the interaction system 100, the initial message may also expire and the non-user may no longer be allowed to receive or view the content item, even if the non-user does subsequently sign up and access the interaction system 100 using the interaction client 104. The text message 804 also includes an invitation to unsubscribe from text messages originating from the interaction system 100, and an unsubscribe URL 808 that is user-selectable to direct the recipient user to an unsubscribe service of the interaction system 100.

If the non-user decides to sign up to the interaction system 100 (the non-user is referred to as the "new user" in this context), a phone verification process may be carried out via the SMS link. Once phone verification has been completed, either as part of or subsequent to the electronic account registration process, the platform account becomes linked to the phone number of the recipient.

In some examples, it may be the case that the recipient of the text message 804 does actually have a platform account with the interaction system 100, but has simply never linked their phone number to the platform account (e.g., through a phone verification process). In such cases, selection of the message URL 806 may allow the recipient to deep-link into their interaction client 104, where the interaction client 104 prompts the recipient to confirm their phone number. The recipient can view the content item shown in FIG. 5 on the platform via the interaction client 104 conventionally as a registered user.

In some examples, a non-user recipient may receive off-platform communications from multiple users. Where a non-user receives multiple off-platform messages from different users of the interaction system, relationship establishment may be treated differently depending on which off-platform message (e.g., registration link) is utilized by the non-user for platform on-boarding. Where the sender has a first platform account and the recipient establishes a second platform account, establishing the relationship between the first platform account and the second platform account within the interaction system may be based on whether the registration link in the off-platform communication from the sender with the first platform account was used in the electronic account registration process for the second platform account, or whether the recipient used another "route" to establish the second platform account.

For example, the recipient in FIG. 8 may have received text messages with registration links from a first user, a second user, and a third user of the interaction system 100. As the recipient is a non-user, three text messages are transmitted, each inviting the user to register with the interaction system 100 in order to view the content items respectively shared by the first user, the second user, and the third user. If the recipient decides to sign up with the interaction system 100 via the registration link originating from the first user, the interaction system 100 may automatically establish a bidirectional relationship between the accounts of the first user and the recipient (new user), as registration via the specific link is deemed to be a reciprocation of the first user's "friend request." On the other hand, a bidirectional relationship is not established with the second user or the third user. For example, one-directional relationships may instead be established between the accounts of the new user and the second user, and between the accounts of the new user and the third user, once the new user has registered and until the new user adds the second and/or third user as a "friend" on the platform.

As discussed above, in some examples, selection of a non-user as a recipient by the active sending user not only causes transmission of an off-platform message as shown in FIG. 8, but it also causes establishment of a pending relationship request and a pending message within the interaction system 100. As the non-user recipient is not yet registered with the interaction system 100, the user management system 220 may not yet establish a formal relationship link with the active sending user within the interaction system 100 and also may not yet enable the recipient to view the content item shown in FIG. 5. Accordingly, these can be seen as a "pending" relationship request and a "pending" message, respectively, that are surfaced and presented once the non-user becomes a registered user (and, in some examples, once the relevant recipient identifier, e.g., phone number, is linked to the platform account). For example, in respect of the content item that is shared, a pending inbox is essentially generated by the user management system 220 or the messaging system 210 for the non-user that is activated and surfaced once the non-user becomes a user. In some examples, in the case of a pending relationship request, upon registration by the non-user, the pending relationship request may automatically be converted to an active relationship request by the pending request system 236, e.g., a one-directional relationship is established by the user management system 220 with a request to convert such relationship to a bidirectional relationship. Once the new user also adds the sending user as a "friend," the one-directional relationship may be converted by the user management system 220 to a two-directional relationship.

The examples described with reference to FIG. 5 to FIG. 8 focus on the transmission of an off-platform communication to a non-user of the interaction system 100. However, in some examples, and as alluded to above, a similar off-platform communication (e.g., text message) may be sent to an existing user from a sending user, if the existing user has either not linked their phone number to their platform account or has disabled discovery of their platform account via their linked phone number. As a result, the sending user is not able to share a content item as a message directly on the platform and an off-platform message containing a suitable link is transmitted instead. In such cases, the recipient of the off-platform communication, being an existing user, can simply access the message shared by the sending user by selecting the link in the off-platform communication.

Figure 9:
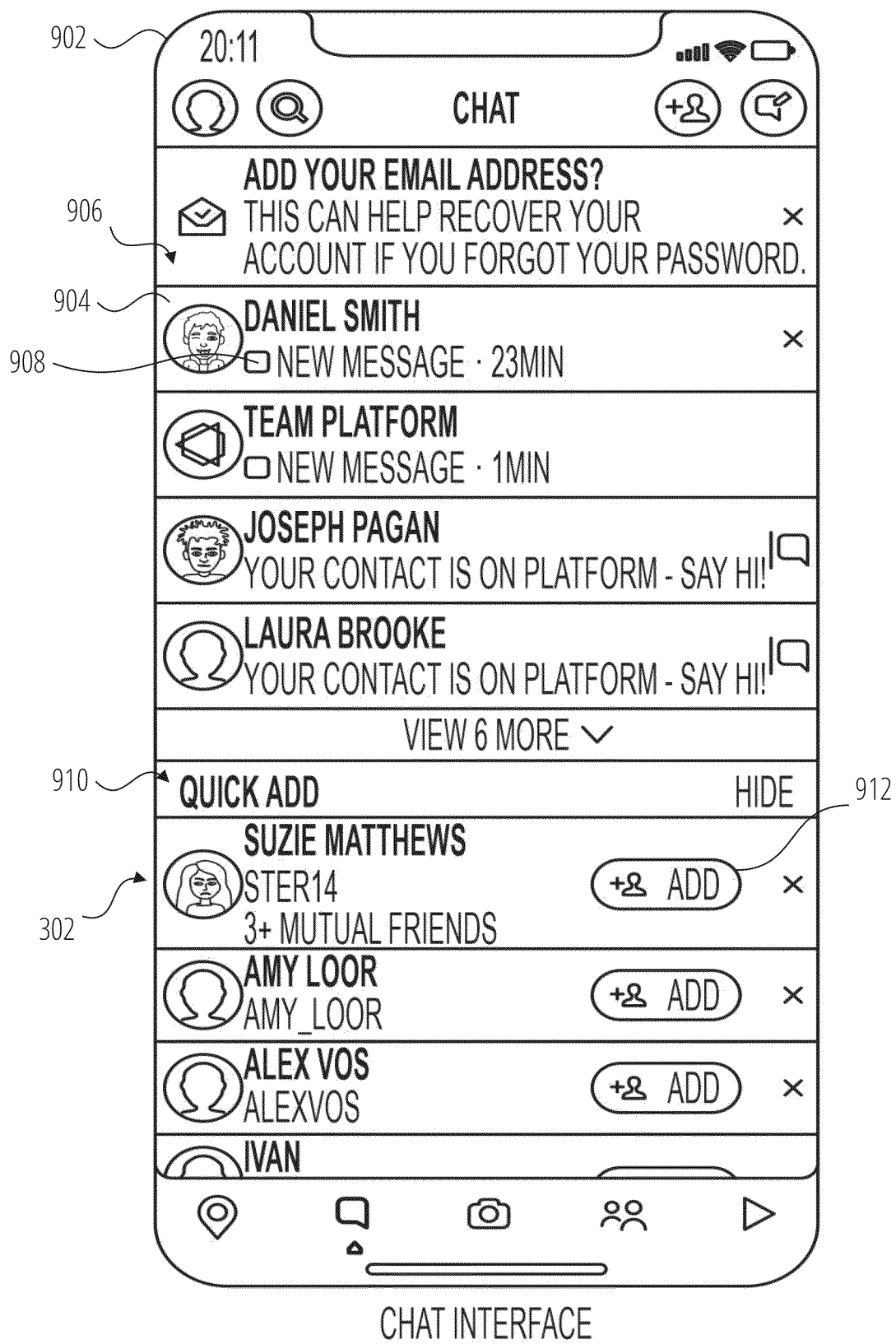
FIG. 9 is a user interface diagram showing a chat interface, also referred to as a message feed interface, according to some examples.

FIG. 9 is a user interface diagram illustrating a chat interface 902 (or message feed interface), according to some examples, as may be presented to the new user post-registration.

A receiving user, having downloaded and installed the interaction client 104 and having completed a registration process (e.g., via phone number verification) with the interaction system 100, is then presented with the chat interface 902.

As mentioned, the content item initially shared by the sending user may be surfaced once the new user has completed registration and accesses the chat interface 902 using the interaction client 104. In some examples, and as is the case in FIG. 9, where both the sending user and the receiving user have each other in their contact books, a cell 904 for the sending user appears as a conversation in a friend feed 906 of the chat interface 902. The cell 904 provides a visual indication of a new message 908. The cell 904 is actionable to open the new message 908, thereby allowing the new user (recipient) to access and interact with the content item shared by the sending user. Accordingly, a pending message is no longer pending and becomes a delivered message, surfaced via the chat interface 902, once the new user has registered and accesses the interaction client 104 using their platform account linked to the phone number selected by the sending user at the time of initially performing the sharing operation (see FIG. 7).

The new message 908 shown in FIG. 9 may, for example, be dependent on the viewing user having enabled "non-friend" messaging, e.g., chatting with a user via the interaction client 104 even though there is no bidirectional relationship between the two users. In some examples, conditions to be met before such messaging is enabled between users that have not established a bidirectional relationship as recorded on the interaction system may include one or more of:

The sending user is phone-verified (as opposed to merely email-verified).

The sending user has the receiving user in a locally-stored contact book (e.g., maintained by the contacts application) on a user system of the sending user.

The sending user has invited the receiving user to register with the interaction system 100.

The receiving user registers were the interaction system 100.

The receiving user is phone-verified.

The receiving user has the sending user in a contact book on a user system of the receiving user.

As shown in FIG. 9, the chat interface 902 further includes quick add suggestions 910, which are suggestions for users with which the active viewing user can enter into a bidirectional relationship (e.g., a "friend" relationship) on the interaction system 100. Each suggestion within the quick add suggestions 910 includes profile data 302, as well as an associated quick add button 912 that is user-selectable to enable the active user to add the suggested user quickly and conveniently to a friend group of the active user. The quick add button 912 is an example of a user-selectable relationship establishment element.

Also shown in association with the profile data 302 is a subtext that contextualizes or provides some helpful information regarding the suggested user. For example, where a suggested user in the quick add suggestions 910 has invited an active, viewing user to register with the interaction system 100 using a text message, the subtext reads "invited you via SMS." The subtext may also indicate a number of mutual friends, whether the relevant user is new to the interaction system 100, or whether the relevant user appears in a contact book of a contacts application, or the nature of a relationship (e.g., contact, friend, subscribed, etc.) between the suggested user and the active viewing user.

Figure 10:
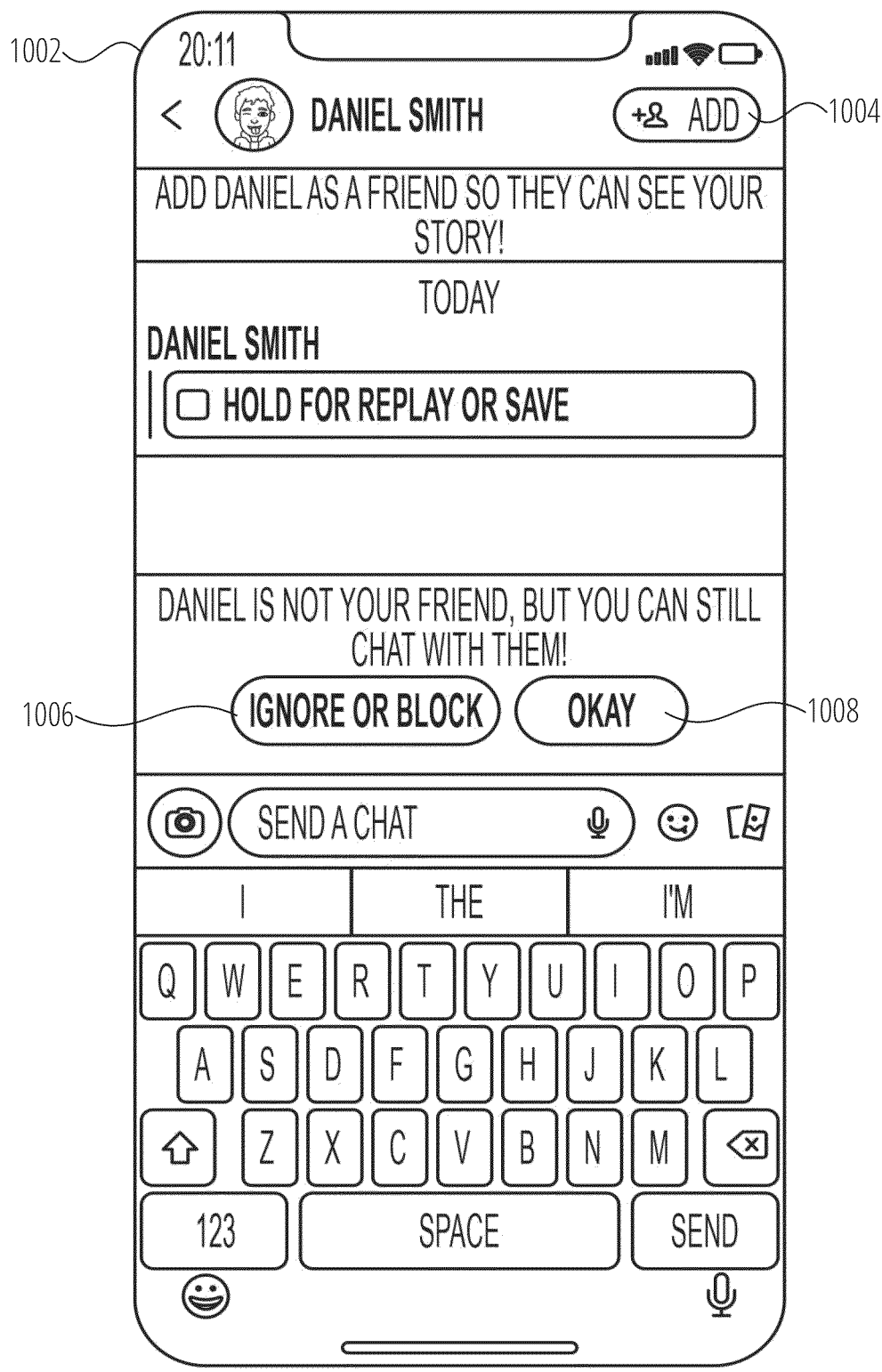
FIG. 10 is a user interface diagram showing a chat thread interface according to some examples.
Figure 11:
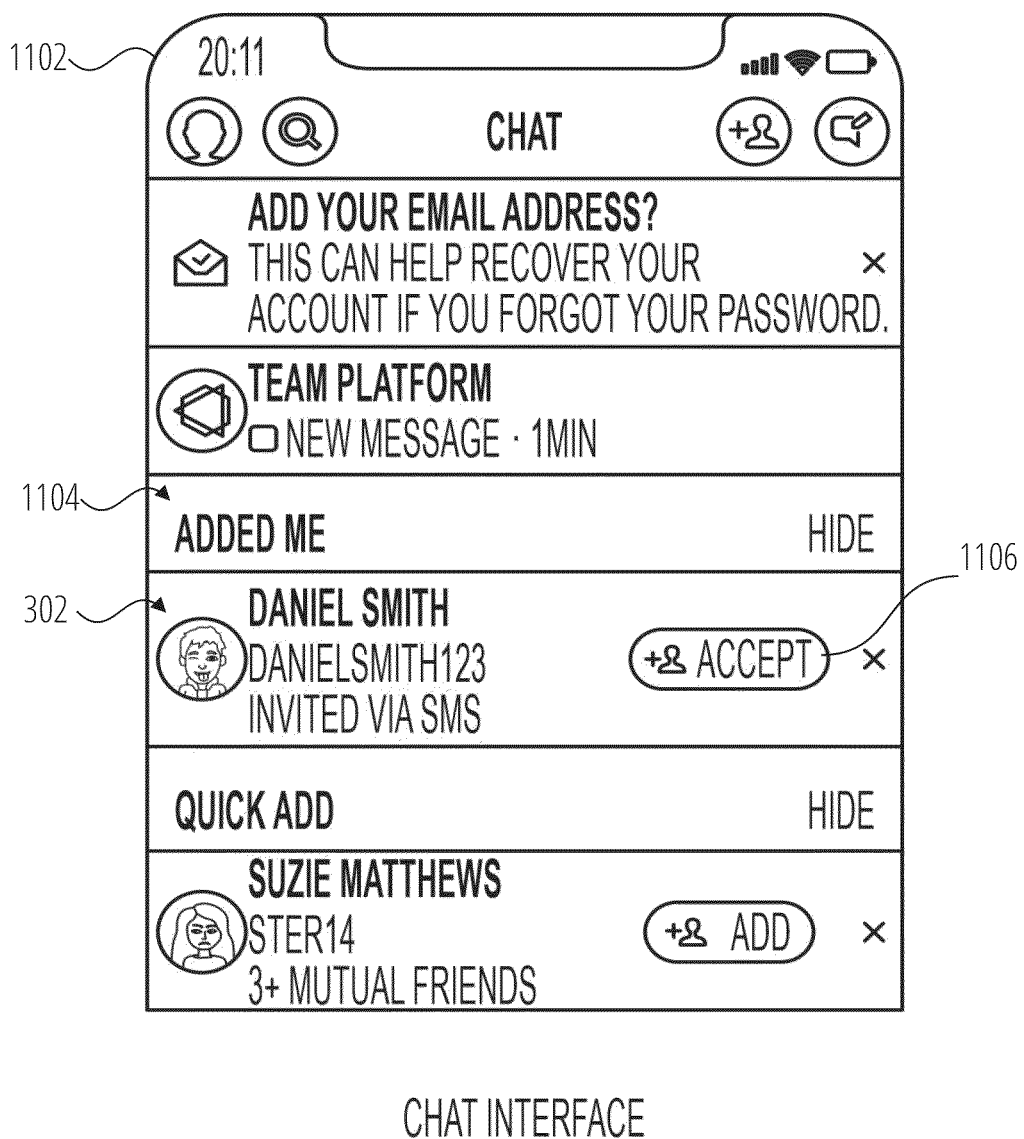
FIG. 11 is a user interface diagram showing a chat interface, also referred to as a message feed interface, according to some examples.

FIG. 10 is a user interface diagram illustrating a chat thread interface 1002 or messaging user interface, according to some examples, to enable a chat session between a sending user and a receiving user, with the chat thread interface 1002 being presented to the receiving user on receiving a message, via the interaction client 104, from a "non-friend" user. For example, the active sending user sends the content item as shown in FIG. 5 to FIG. 8 to a non-user (receiving user), who then registers a platform account with the interaction system 100 and uses the interaction client 104 to view the message. Upon registration, a one-directional relationship may be established between the sending user and the receiving user in the interaction system 100 (updating the pending relationship request to a formal relationship). The relationship is one-directional given that the sending user has added the receiving user as a friend by sending the initial message, while the receiving user has not yet added the sending user as a friend.

The chat thread interface 1002 may include a mechanism to establish a bidirectional relationship in the context of the interaction system. In FIG. 10, the chat thread interface 1002 presents an add button 1004 that is user-selectable to enable the convenient adding of the sending user as a "friend" of the receiving user on the interaction system 100. If the receiving user selects the add button 1004, the one-directional relationship is converted to a bidirectional relationship and the entity table 308 and entity graph 310 are updated accordingly. In other words, a record of the bidirectional relationship may be stored within the interaction system.

Within a messaging portion of the chat thread interface 1002, the receiving user also has the option of blocking communications from the sending user by selection of an ignore or block button 1006, or to accept communications from the sending user by selection of an okay button 1008.

In some examples, and as shown in FIG. 9 and discussed above, once a new user has registered a platform account and verified their phone number (e.g., a platform account has been created and linked to the relevant phone number), all messages that were previously shared to the linked phone number are automatically surfaced in a chat interface, e.g., by the messaging system 210. This facilitates interaction between existing users and a new user, e.g., because the existing users do not have to re-send previous messages shared with the new user at a time when the new user had not yet registered with the interaction system 100. The new user may thus immediately be presented with inbound messages, shown as "waiting for them" in the chat interface once they access the interaction client 104.

In some examples, once a new user has registered a platform account and verified their phone number (e.g., a platform account has been created and linked to the relevant phone number), other platform accounts associated with existing users that have shared messages to the linked phone number are automatically surfaced in a chat interface as user suggestions (recommended friends). These platform accounts may, for example, be presented under the quick add suggestions 910 or an "added me" section (described below with reference to FIG. 11) with an indication that the relevant user invited the new user via SMS, and with an option to establish a bidirectional relationship. This further facilitates interaction between existing users and a new user, e.g., because the existing users do not have to wait until the new user has registered to send a friend request and initiate relationship-establishment and/or do not have to re-send previously sent friend requests.

In some examples, in response to the receiving user establishing a platform account that is linked to their phone number, the receiving user may accordingly be presented, by the user management system 220, with a user suggestion related to the sender. The user suggestion includes profile data of the sender and indicates a suggestion or option to establish a bidirectional relationship with the sender in the context of the interaction system 100. Specifically, in FIG. 11, a user interface diagram is shown illustrating a chat interface 1102, according to some examples, that may be presented by the interaction client 104 in a situation where messaging functionality between unrelated "non-friend" users is not enabled as a result of requirements within the interaction system 100, as described above with reference to FIG. 9, not being satisfied. In this case, the receiving/viewing user (new user) would still see the details of users that invited the viewing user to establish a bidirectional relationship by messaging (e.g., SMS), in an added me section 1104.

In this case, the profile data 302 for the inviting user (e.g., "Daniel Smith") is shown as a suggestion in the added me section 1104 and accompanied by subtext indicating that an invitation had been extended by SMS. The chat interface 1102 presents an accept button 1106 in a cell that provides the profile data 302 for the inviting user. The accept button 1106 is user-selectable to cause convenient establishment of a bidirectional relationship between the inviting user and the new user.

In some examples, once a new user registers after receiving an off-platform communication, a pending friend request is converted to an active friend request that is automatically presented (either via a non-friend message feature or "invited you via SMS" subtext). Alternatively, in some examples, the bidirectional relationship may be automatically established based on a registration via a specific link, as described above.

Referring again to FIG. 11, as discussed elsewhere, a non-user recipient may receive off-platform communications from multiple users, with relationship establishment treated differently depending on which off-platform message (e.g., registration link) was utilized by the non-user for platform on-boarding. For example, the viewing recipient in FIG. 11 may have received two separate off-platform messages, one from "Daniel Smith" and one from a second user. If the user uses the link sent by the second user to register, no bidirectional relationship is established with "Daniel Smith" and their profile data 302 is instead presented in the manner shown in FIG. 11. On the other hand, a bidirectional relationship may automatically be established with the second user and the content item/s shared by the second user prior to registration may automatically be presented to the new user when the new user opens the interaction client 104 post-registration.

Generally, a recipient may thus receive a plurality of off-platform communications, each associated with a different platform account within the interaction system 100 and including a unique registration link. When detecting establishment, by the recipient (non-user), of a new platform account within the interaction system 100, the interaction system 100 (e.g., the user management system 220) may identify a unique registration link from among the plurality of unique registration links that was used to initiate establishment of the recipient's new platform account. For example, the interaction system 100 may determine which sender's link was actually used to initiate the registration process. A bidirectional relationship is then automatically established between the recipient's new platform account and the platform account from among the plurality of platforms accounts that is associated with the identified registration link. Further, in some examples, for each particular platform account from the among the plurality of platform accounts that is not associated with the identified registration link (e.g., those senders responsible for sending links that were not used by the new user), a one-directional relationship is automatically established between the particular platform account and the recipient's new platform account.

Figure 12:
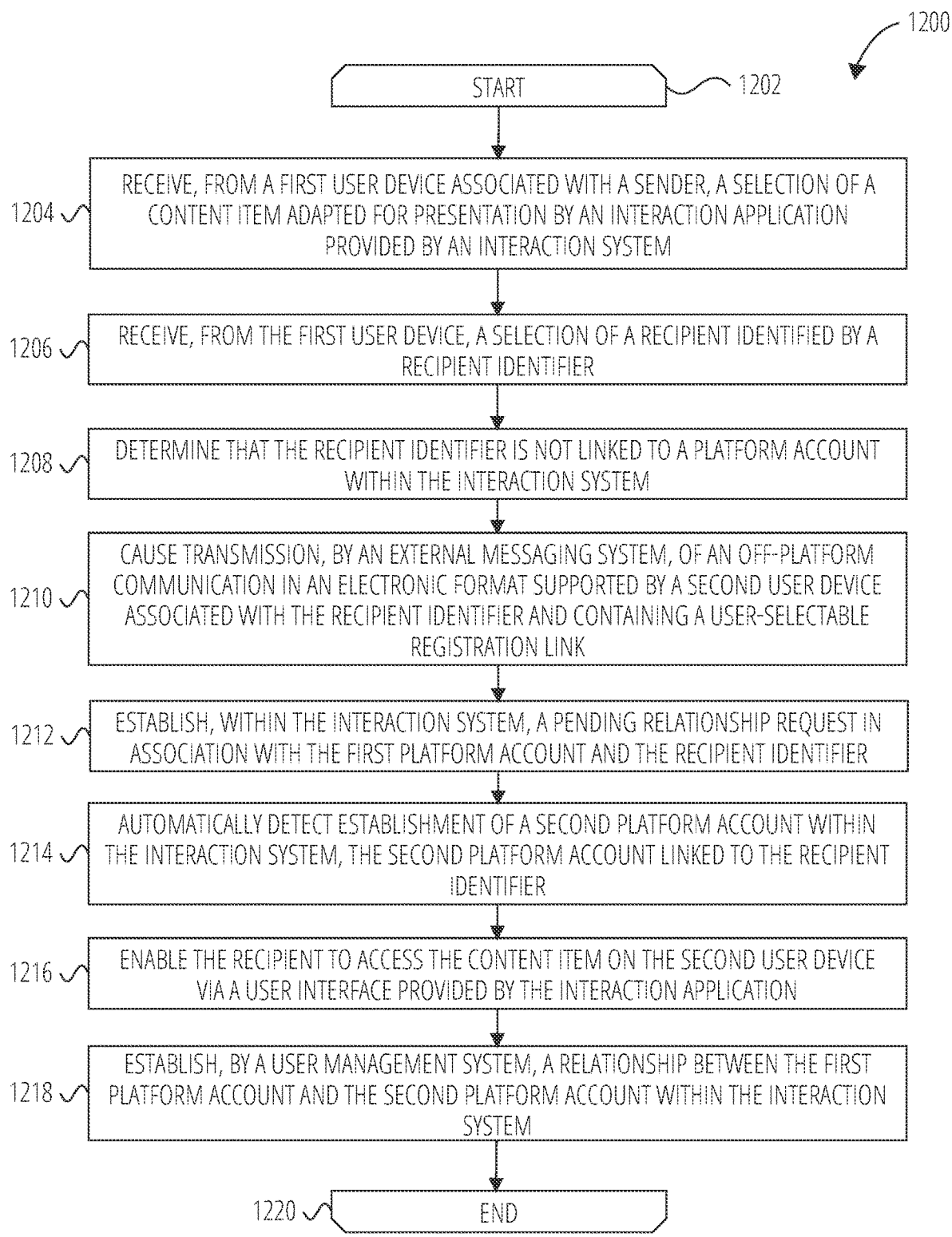
FIG. 12 is a flow diagram illustrating a method to facilitate off-platform messaging and establishment of user relationships, according to some examples.

FIG. 12 is a flowchart illustrating a method 1200, according to some examples, to facilitate off-platform messaging and establishment of user relationships. The description below refers to a "sender" and a "recipient." Merely by way of non-limiting example, the sender may be a registered user of the interaction system 100, such as the user 402 shown in FIG. 4, and the recipient may (initially) be a non-user, such as the non-user 412 shown in FIG. 4. For explanatory purposes, the operations of the method 1200 are described herein as occurring in serial, or linearly. However, multiple operations of the method 1200 may occur in parallel. In addition, the operations of the method 1200 need not be performed in the order shown and/or one or more blocks of the flowchart need not be performed and/or can be replaced by other operations. The method 1200 may also be carried out by various components of the interaction system 100, including, for example, the external messaging system 234 and the pending request system 236.

The sender has a first platform account within the interaction system 100, while the recipient initially does not have a platform account. The method 1200 commences at opening loop block 1202, and proceeds to operation 1204 where the interaction system 100 receives, from a first user device of the sender, a selection of a content item. The first user device may be any suitable user system 102 such as the mobile device 114 and the content item may be a media content item generated or captured using the interaction client 104 (as an example of an interaction application provided by an interaction system). The content item is thus adapted for presentation by the interaction client 104 provided by the interaction system 100 and is not viewable off-platform, for instance, using a conventional SMS messaging application.

The external messaging system 234 then receives a selection of a recipient at operation 1206. As mentioned, the sender may use a user interface such as the send interface 602 or the send interface 704 to select a recipient with a phone number (recipient identifier) not linked to a registered platform account.

The interaction system 100 determines that the recipient identifier (e.g., phone number) is not linked to a platform account within the interaction system at operation 1208. As described above, e.g., with reference to FIG. 4, the interaction system 100 may maintain first electronic contact data for a plurality of users of the interaction system 100, each user having a platform account, and may access second electronic contact data associated with an external application of the sender that is distinct from the interaction client 104, e.g., the contacts application 422. Based on detecting that the recipient's phone number is not linked to any platform account, the recipient may be designated, by the external messaging system 234, as a non-user and/or the external messaging system 234 may determine that an off-platform communication in the form of a text-based invitation is required. The recipient identifier and other details of the recipient may be presented via a send to interface as part of a contact list together with a user-selectable off-platform messaging selector (e.g., the selector 706). Accordingly, the selection of the recipient may include selection of the user-selectable off-platform messaging selector corresponding to the recipient in a contact list.

At operation 1210, in response to determining that the recipient identifier is not linked to a platform account and in response to the selection of the recipient by the sender, the external messaging system 234 causes transmission of an off-platform communication in an electronic format supported by a second user device associated with the recipient identifier. The second user device may be a mobile device of the recipient associated with the phone number of the recipient. The off-platform communication is, for example, a text (e.g., SMS) message containing a user-selectable registration link. In some examples, the off-platform communication does not include the content item and the content item only becomes accessible by the recipient subsequent to establishment, by the recipient, of a platform account linked to the recipient identifier.

As discussed elsewhere, and as shown at operation 1212, the method 1200 may include establishing, within the interaction system 100 and by the pending request system 236, a pending relationship request in association with the first platform account and the recipient identifier. At operation 1214, the interaction system 100 detects establishment of a second platform account within the interaction system 100. The second platform account is linked to the recipient identifier. Establishment of the second platform account may include selection of the registration link by the recipient via the second user device, resulting in an electronic account registration process being initiated.

As a result of the establishment of the second platform account of the recipient, the pending request system 236 may convert the pending relationship request to an active relationship request. The active relationship request may be a request, presented to the recipient via the interaction client 104, to establish a bidirectional relationship between the sender and the recipient in the context of the interaction system 100.

Further, in response to the establishment of the second platform account, the recipient is enabled, by the interaction system 100, to access the content item on the second user device via a user interface provided by the interaction client 104 (operation 1216). This may involve detecting, by the interaction system 100, that the recipient has accessed the interaction client 104 using the newly established second platform account and, in response thereto, causing presentation of a message from the sender that includes the content item. Presentation may be effected via suitable interfaces such as the chat interface 902 or the chat thread interface 1002. In some examples, the message is designated as a pending message prior to establishment of the second platform account linked to the recipient identifier and is only made available to the recipient in response to the establishment of the second platform account linked to the recipient identifier.

In addition to enabling the recipient to access the content item, a relationship between the sender and the recipient is established, e.g., by the user management system 220 establishing and recording, within the interaction system 100, a relationship between the first platform account and the second platform account (operation 1218). As discussed elsewhere, depending on a number of factors, this relationship may be a one-directional or a bidirectional relationship.

Further, the method 1200 may include presenting, by the interaction system 100, a messaging user interface including a mechanism to establish a bidirectional relationship with the sender in the context of the interaction system. For example, where the sender has added the recipient as a friend, but not vice versa, the recipient may be presented with a user-selectable relationship establishment element, e.g., the add button 1004 as shown in FIG. 10. In response to receiving a selection of the user-selectable relationship establishment element, the interaction system 100 (e.g., the user management system 220) may convert the one-directional relationship to a bidirectional relationship and a record of the bidirectional relationship may be stored in the entity table 308 and indicated in the entity graph 310 of the interaction system 100. The method 1200 concludes at closing loop block 1220.

Data Communications Architecture

Figure 13:
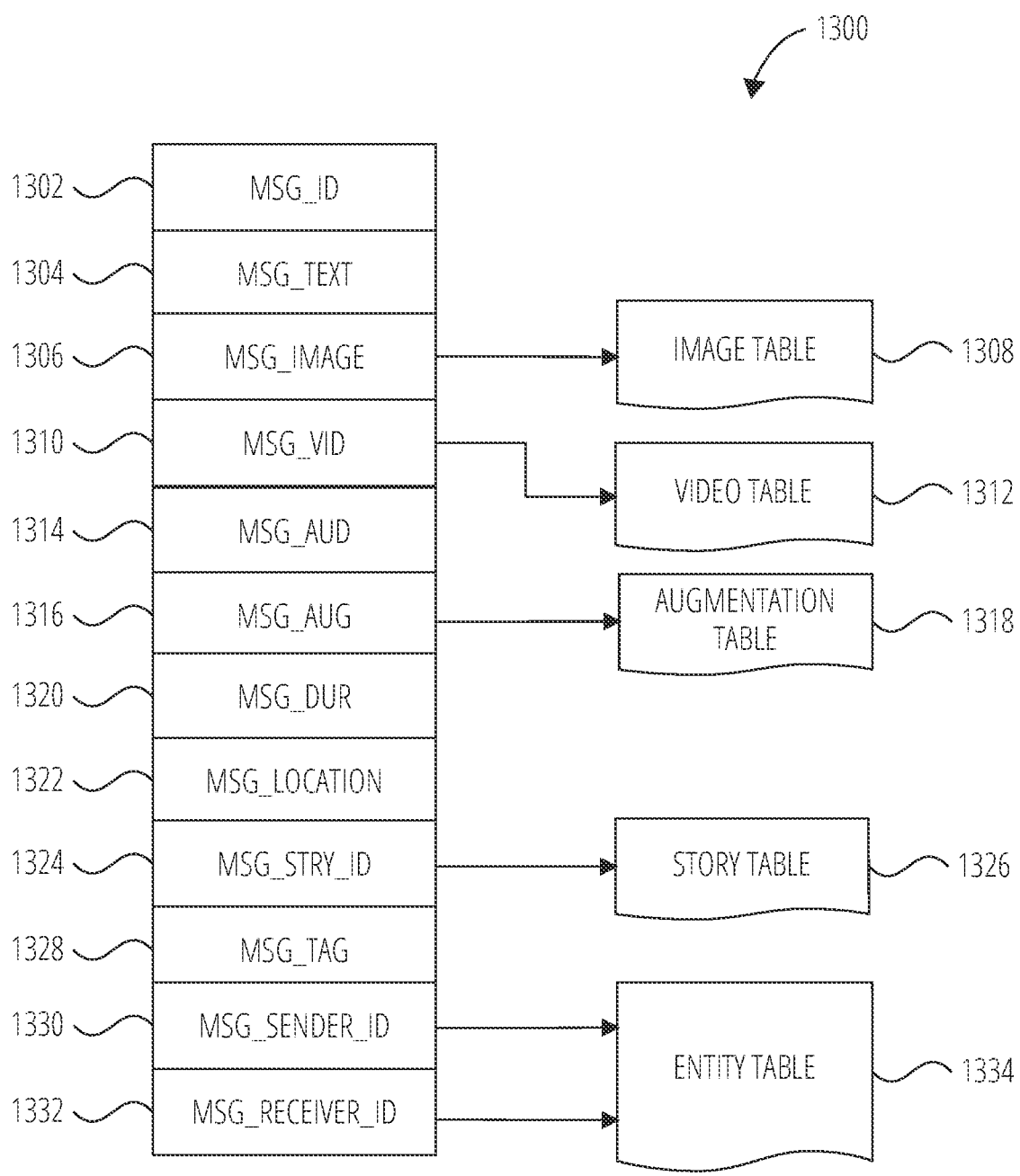
FIG. 13 is a diagrammatic representation of a message, according to some examples.

FIG. 13 is a schematic diagram illustrating a structure of a message 1300, according to some examples, generated by an interaction client 104 for communication to a further interaction client 104 via the interaction servers 124. The content of a particular message 1300 is used to populate the message table 306 stored within the database 304, accessible by the interaction servers 124. Similarly, the content of a message 1300 is stored in memory as "in-transit" or "in-flight" data of the user system 102 or the interaction servers 124. A message 1300 is shown to include the following example components:

Message identifier 1302: a unique identifier that identifies the message 1300.

Message text payload 1304: text, to be generated by a user via a user interface of the user system 102, and that is included in the message 1300.

Message image payload 1306: image data, captured by a camera component of a user system 102 or retrieved from a memory component of a user system 102, and that is included in the message 1300. Image data for a sent or received message 1300 may be stored in the image table 1308.

Message video payload 1310: video data, captured by a camera component or retrieved from a memory component of the user system 102, and that is included in the message 1300. Video data for a sent or received message 1300 may be stored in the video table 1312.

Message audio payload 1314: audio data, captured by a microphone or retrieved from a memory component of the user system 102, and that is included in the message 1300.

Message augmentation data 1316: augmentation data (e.g., filters, stickers, or other annotations or enhancements) that represents augmentations to be applied to message image payload 1306, message video payload 1310, or message audio payload 1314 of the message 1300. Augmentation data for a sent or received message 1300 may be stored in the augmentation table 1318.

Message duration parameter 1320: parameter value indicating, in seconds, the amount of time for which content of the message (e.g., the message image payload 1306, message video payload 1310, message audio payload 1314) is to be presented or made accessible to a user via the interaction client 104.

Message geolocation parameter 1322: geolocation data (e.g., latitudinal and longitudinal coordinates) associated with the content payload of the message. Multiple message geolocation parameter 1322 values may be included in the payload, each of these parameter values being associated with respect to content items included in the content (e.g., a specific image within the message image payload 1306, or a specific video in the message video payload 1310).

Message story identifier 1324: identifier values identifying one or more content collections (e.g., "stories" identified in the story table 1326) with which a particular content item in the message image payload 1306 of the message 1300 is associated. For example, multiple images within the message image payload 1306 may each be associated with multiple content collections using identifier values.

Message tag 1328: each message 1300 may be tagged with multiple tags, each of which is indicative of the subject matter of content included in the message payload. For example, where a particular image included in the message image payload 1306 depicts an animal (e.g., a lion), a tag value may be included within the message tag 1328 that is indicative of the relevant animal. Tag values may be generated manually, based on user input, or may be automatically generated using, for example, image recognition.

Message sender identifier 1330: an identifier (e.g., a messaging system identifier, email address, or device identifier) indicative of a user of the user system 102 on which the message 1300 was generated and from which the message 1300 was sent.

Message receiver identifier 1332: an identifier (e.g., a messaging system identifier, email address, or device identifier) indicative of a user of the user system 102 to which the message 1300 is addressed.

The contents (e.g., values) of the various components of message 1300 may be pointers to locations in tables within which content data values are stored. For example, an image value in the message image payload 1306 may be a pointer to (or address of) a location within an image table 1308. Similarly, values within the message video payload 1310 may point to data stored within a video table 1312, values stored within the message augmentation data 1316 may point to data stored in an augmentation table 1318, values stored within the message story identifier 1324 may point to data stored in a story table 1326, and values stored within the message sender identifier 1330 and the message receiver identifier 1332 may point to user records stored within an entity table 1334.

System with Head-Wearable Apparatus

Figure 14:
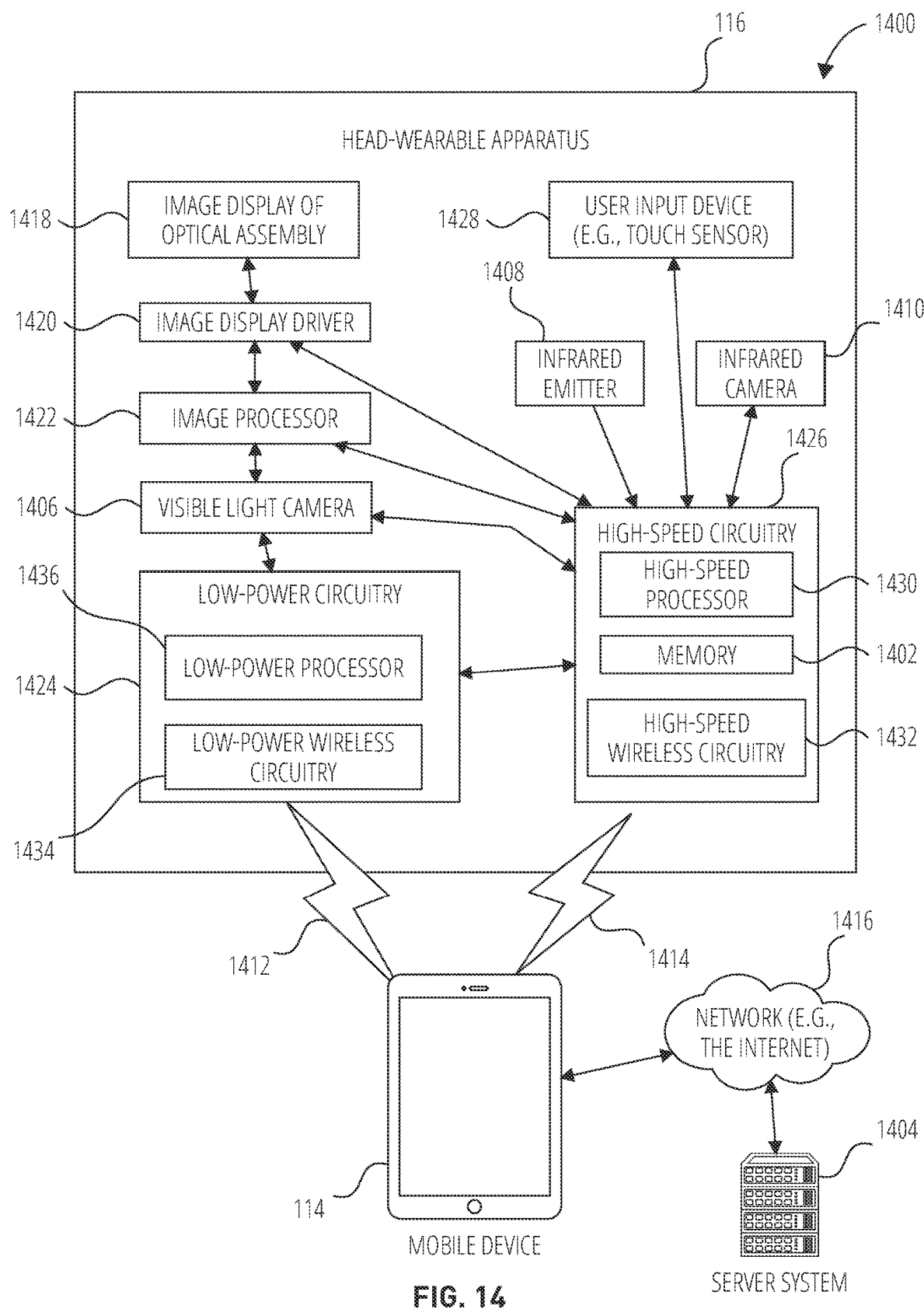
FIG. 14 illustrates a system including a head-wearable apparatus, according to some examples.

FIG. 14 illustrates a system 1400 including a head-wearable apparatus 116 with a selector input device, according to some examples. FIG. 14 is a high-level functional block diagram of an example head-wearable apparatus 116 communicatively coupled to a mobile device 114 and various server systems 1404 (e.g., the interaction server system 110) via various networks 108.

The head-wearable apparatus 116 includes one or more cameras, each of which may be, for example, a visible light camera 1406, an infrared emitter 1408, and an infrared camera 1410.

The mobile device 114 connects with head-wearable apparatus 116 using both a low-power wireless connection 1412 and a high-speed wireless connection 1414. The mobile device 114 is also connected to the server system 1404 and the network 1416.

The head-wearable apparatus 116 further includes two image displays of the image display of optical assembly 1418. The two image displays of optical assembly 1418 include one associated with the left lateral side and one associated with the right lateral side of the head-wearable apparatus 116. The head-wearable apparatus 116 also includes an image display driver 1420, an image processor 1422, low-power circuitry 1424, and high-speed circuitry 1426. The image display of optical assembly 1418 is for presenting images and videos, including an image that can include a graphical user interface to a user of the head-wearable apparatus 116.

The image display driver 1420 commands and controls the image display of optical assembly 1418. The image display driver 1420 may deliver image data directly to the image display of optical assembly 1418 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1428 (e.g., touch sensor or push button), including an input surface on the head-wearable apparatus 116. The user input device 1428 (e.g., touch sensor or push button) is to receive from the user an input selection to manipulate the graphical user interface of the presented image.

The components shown in FIG. 14 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1406 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1402, which stores instructions to perform a subset or all of the functions described herein. The memory 1402 can also include a storage device.

As shown in FIG. 14, the high-speed circuitry 1426 includes a high-speed processor 1430, a memory 1402, and high-speed wireless circuitry 1432. In some examples, the image display driver 1420 is coupled to the high-speed circuitry 1426 and operated by the high-speed processor 1430 in order to drive the left and right image displays of the image display of optical assembly 1418. The high-speed processor 1430 may be any processor capable of managing high-speed communications and operation of any general computing system needed for the head-wearable apparatus 116. The high-speed processor 1430 includes processing resources needed for managing high-speed data transfers on a high-speed wireless connection 1414 to a wireless local area network (WLAN) using the high-speed wireless circuitry 1432. In certain examples, the high-speed processor 1430 executes an operating system such as a LINUX operating system or other such operating system of the head-wearable apparatus 116, and the operating system is stored in the memory 1402 for execution. In addition to any other responsibilities, the high-speed processor 1430 executing a software architecture for the head-wearable apparatus 116 is used to manage data transfers with high-speed wireless circuitry 1432. In certain examples, the high-speed wireless circuitry 1432 is configured to implement Institute of Electrical and Electronic Engineers (IEEE) 802.11 communication standards, also referred to herein as WiFi. In some examples, other high-speed communications standards may be implemented by the high-speed wireless circuitry 1432.

The low-power wireless circuitry 1434 and the high-speed wireless circuitry 1432 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1412 and the high-speed wireless connection 1414, may be implemented using details of the architecture of the head-wearable apparatus 116, as can other elements of the network 1416.

The memory 1402 includes any storage device capable of storing various data and applications, including, among other things, camera data generated by the left and right visible light cameras 1406, the infrared camera 1410, and the image processor 1422, as well as images generated for display by the image display driver 1420 on the image displays of the image display of optical assembly 1418. While the memory 1402 is shown as integrated with high-speed circuitry 1426, in some examples, the memory 1402 may be an independent standalone element of the head-wearable apparatus 116. In certain such examples, electrical routing lines may provide a connection through a chip that includes the high-speed processor 1430 from the image processor 1422 or the low-power processor 1436 to the memory 1402. In some examples, the high-speed processor 1430 may manage addressing of the memory 1402 such that the low-power processor 1436 will boot the high-speed processor 1430 any time that a read or write operation involving memory 1402 is needed.

As shown in FIG. 14, the low-power processor 1436 or high-speed processor 1430 of the head-wearable apparatus 116 can be coupled to the camera (visible light camera 1406, infrared emitter 1408, or infrared camera 1410), the image display driver 1420, the user input device 1428 (e.g., touch sensor or push button), and the memory 1402.

The head-wearable apparatus 116 is connected to a host computer. For example, the head-wearable apparatus 116 is paired with the mobile device 114 via the high-speed wireless connection 1414 or connected to the server system 1404 via the network 1416. The server system 1404 may be one or more computing devices as part of a service or network computing system, for example, that includes a processor, a memory, and network communication interface to communicate over the network 1416 with the mobile device 114 and the head-wearable apparatus 116.

The mobile device 114 includes a processor and a network communication interface coupled to the processor. The network communication interface allows for communication over the network 1416, low-power wireless connection 1412, or high-speed wireless connection 1414. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1420. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1404, such as the user input device 1428, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1412 and high-speed wireless connection 1414 from the mobile device 114 via the low-power wireless circuitry 1434 or high-speed wireless circuitry 1432.

Any biometric collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Machine Architecture

Figure 15:
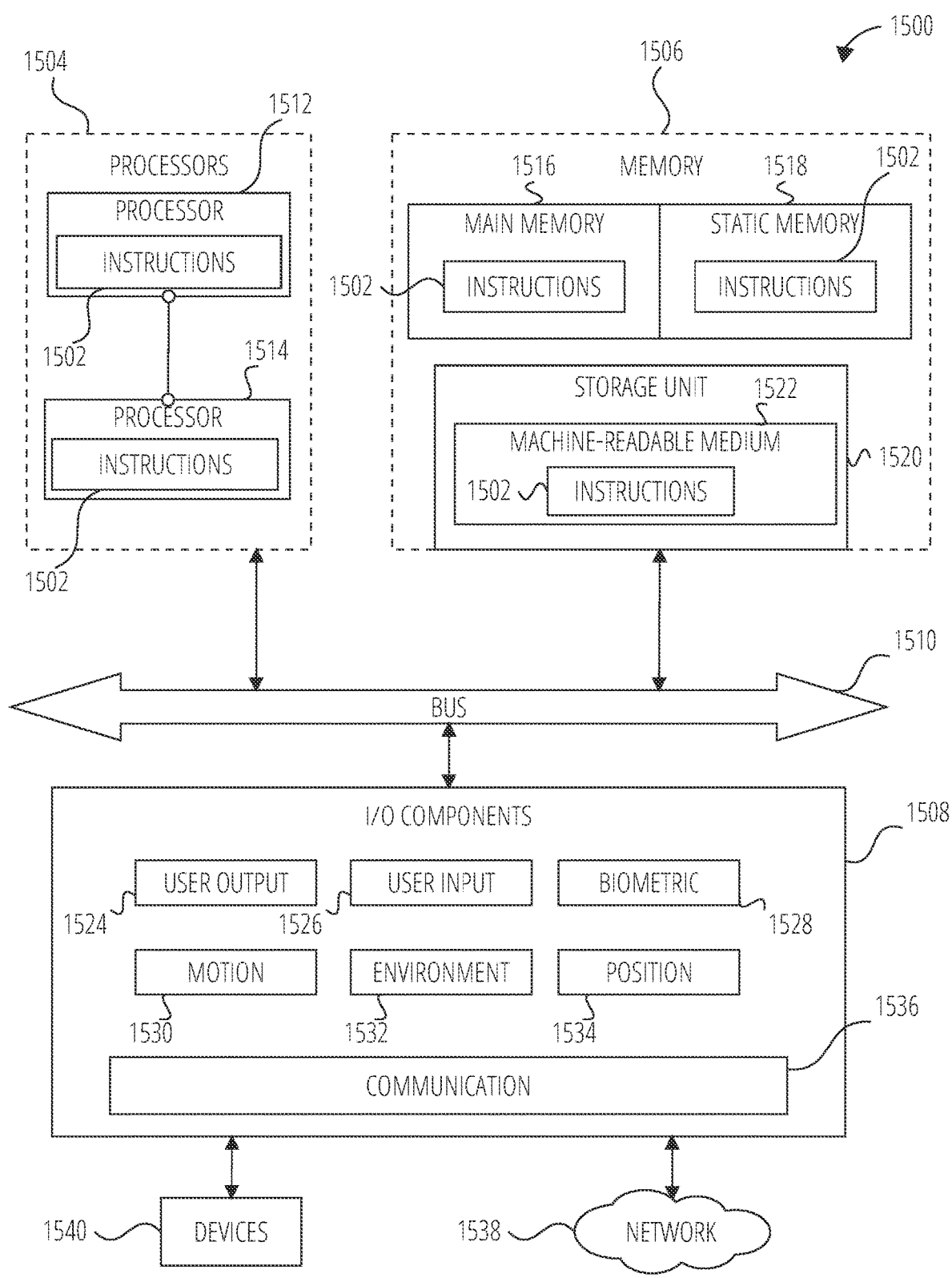
FIG. 15 is a diagrammatic representation of a machine in the form of a computer system within which a set of instructions may be executed to cause the machine to perform any one or more of the methodologies discussed herein, according to some examples.

FIG. 15 is a diagrammatic representation of the machine 1500 within which instructions 1502 (e.g., software, a program, an application, an applet, an app, or other executable code) for causing the machine 1500 to perform any one or more of the methodologies discussed herein may be executed. For example, the instructions 1502 may cause the machine 1500 to execute any one or more of the methods described herein. The instructions 1502 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1502, sequentially or otherwise, that specify actions to be taken by the machine 1500. Further, while a single machine 1500 is illustrated, the term "machine" shall also be taken to include a collection of machines that individually or jointly execute the instructions 1502 to perform any one or more of the methodologies discussed herein. The machine 1500, for example, may comprise the user system 102 or any one of multiple server devices forming part of the interaction server system 110. In some examples, the machine 1500 may also comprise both client and server systems, with certain operations of a particular method or algorithm being performed on the server-side and with certain operations of the particular method or algorithm being performed on the client-side.

The machine 1500 may include processors 1504, memory 1506, and input/output I/O components 1508, which may be configured to communicate with each other via a bus 1510. In an example, the processors 1504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1512 and a processor 1514 that execute the instructions 1502. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single-core, a single processor with multiple cores (e.g., a multi-core processor), multiple processors with a single core, multiple processors with multiples cores, or any combination thereof.

The memory 1506 includes a main memory 1516, a static memory 1518, and a storage unit 1520, both accessible to the processors 1504 via the bus 1510. The main memory 1506, the static memory 1518, and storage unit 1520 store the instructions 1502 embodying any one or more of the methodologies or functions described herein. The instructions 1502 may also reside, completely or partially, within the main memory 1516, within the static memory 1518, within machine-readable medium 1522 within the storage unit 1520, within at least one of the processors 1504 (e.g., within the processor's cache memory), or any suitable combination thereof, during execution thereof by the machine 1500.

The I/O components 1508 may include a wide variety of components to receive input, provide output, produce output, transmit information, exchange information, capture measurements, and so on. The specific I/O components 1508 that are included in a particular machine will depend on the type of machine. For example, portable machines such as mobile phones may include a touch input device or other such input mechanisms, while a headless server machine will likely not include such a touch input device. It will be appreciated that the I/O components 1508 may include many other components that are not shown in FIG. 15. In various examples, the I/O components 1508 may include user output components 1524 and user input components 1526. The user output components 1524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1508 may include biometric components 1528, motion components 1530, environmental components 1532, or position components 1534, among a wide array of other components. For example, the biometric components 1528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1530 include acceleration sensor components (e.g., accelerometer), gravitation sensor components, rotation sensor components (e.g., gyroscope).

Any biometric collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The environmental components 1532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1508 further include communication components 1536 operable to couple the machine 1500 to a network 1538 or devices 1540 via respective coupling or connections. For example, the communication components 1536 may include a network interface component or another suitable device to interface with the network 1538. In further examples, the communication components 1536 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1540 may be another machine or any of a wide variety of peripheral devices (e.g., a peripheral device coupled via a USB).

Moreover, the communication components 1536 may detect identifiers or include components operable to detect identifiers. For example, the communication components 1536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1536, such as location via Internet Protocol (IP) geolocation, location via Wi-Fi® signal triangulation, location via detecting an NFC beacon signal that may indicate a particular location, and so forth.

The various memories (e.g., main memory 1516, static memory 1518, and memory of the processors 1504) and storage unit 1520 may store one or more sets of instructions and data structures (e.g., software) embodying or used by any one or more of the methodologies or functions described herein. These instructions (e.g., the instructions 1502), when executed by processors 1504, cause various operations to implement the disclosed examples.

The instructions 1502 may be transmitted or received over the network 1538, using a transmission medium, via a network interface device (e.g., a network interface component included in the communication components 1536) and using any one of several well-known transfer protocols (e.g., hypertext transfer protocol (HTTP)). Similarly, the instructions 1502 may be transmitted or received using a transmission medium via a coupling (e.g., a peer-to-peer coupling) to the devices 1540.

Software Architecture

Figure 16:
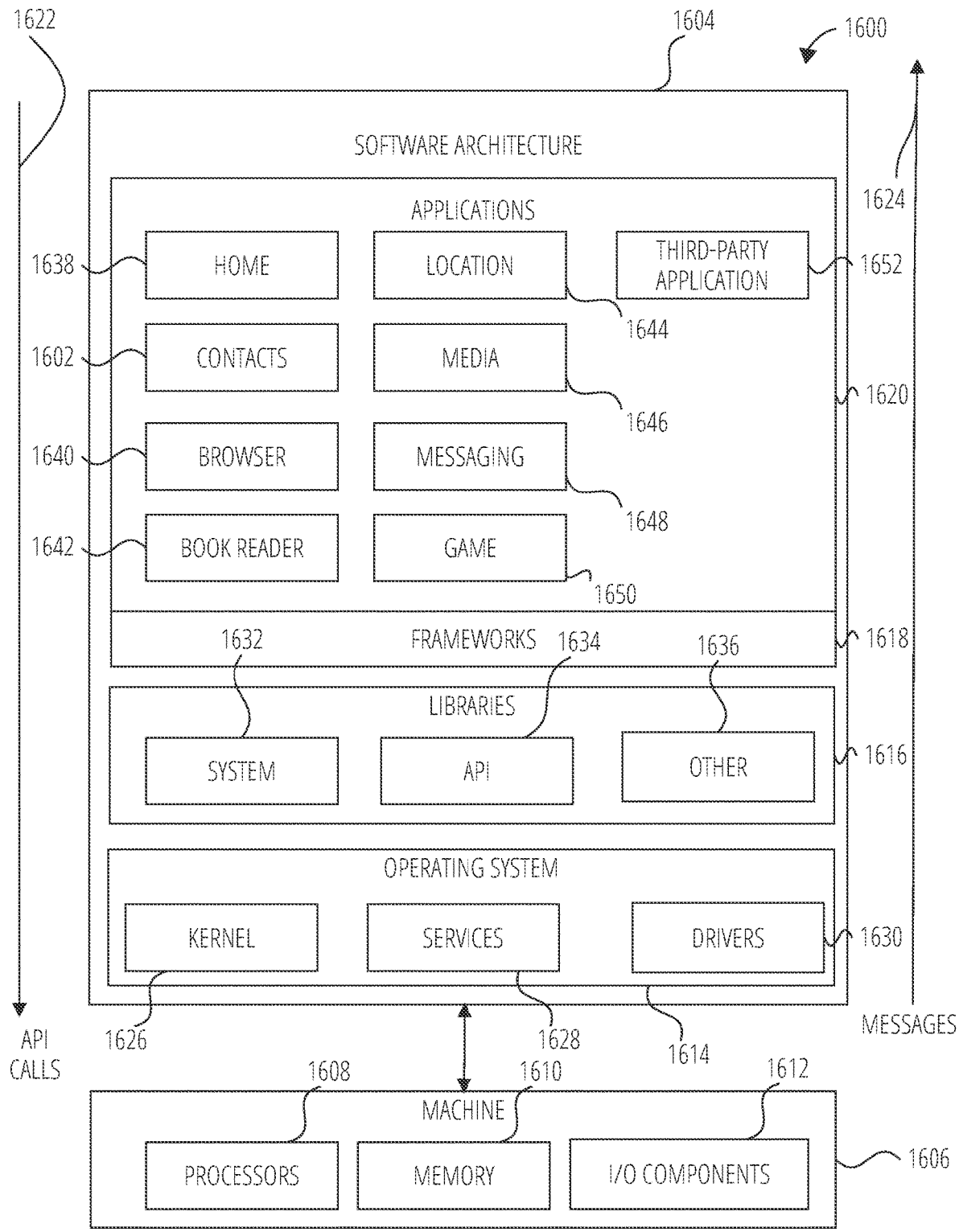
FIG. 16 is a block diagram showing a software architecture within which examples may be implemented.

FIG. 16 is a block diagram 1600 illustrating a software architecture 1604, which can be installed on any one or more of the devices described herein. The software architecture 1604 is supported by hardware such as a machine 1606 that includes processors 1608, memory 1610, and I/O components 1612. In this example, the software architecture 1604 can be conceptualized as a stack of layers, where each layer provides a particular functionality. The software architecture 1604 includes layers such as an operating system 1614, libraries 1616, frameworks 1618, and applications 1620. Operationally, the applications 1620 invoke API calls 1622 through the software stack and receive messages 1624 in response to the API calls 1622.

The operating system 1614 manages hardware resources and provides common services. The operating system 1614 includes, for example, a kernel 1626, services 1628, and drivers 1630. The kernel 1626 acts as an abstraction layer between the hardware and the other software layers. For example, the kernel 1626 provides memory management, processor management (e.g., scheduling), component management, networking, and security settings, among other functionalities. The services 1628 can provide other common services for the other software layers. The drivers 1630 are responsible for controlling or interfacing with the underlying hardware. For instance, the drivers 1630 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1616 provide a common low-level infrastructure used by the applications 1620. The libraries 1616 can include system libraries 1632 (e.g., C standard library) that provide functions such as memory allocation functions, string manipulation functions, mathematic functions, and the like. In addition, the libraries 1616 can include API libraries 1634 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1616 can also include a wide variety of other libraries 1636 to provide many other APIs to the applications 1620.

The frameworks 1618 provide a common high-level infrastructure that is used by the applications 1620. For example, the frameworks 1618 provide various graphical user interface (GUI) functions, high-level resource management, and high-level location services. The frameworks 1618 can provide a broad spectrum of other APIs that can be used by the applications 1620, some of which may be specific to a particular operating system or platform.

In an example, the applications 1620 may include a home application 1638, a contacts application 1602, a browser application 1640, a book reader application 1642, a location application 1644, a media application 1646, a messaging application 1648, a game application 1650, and a broad assortment of other applications such as a third-party application 1652. The applications 1620 are programs that execute functions defined in the programs. Various programming languages can be employed to create one or more of the applications 1620, structured in a variety of manners, such as object-oriented programming languages (e.g., Objective-C, Java, or C++) or procedural programming languages (e.g., C or assembly language). In a specific example, the third-party application 1652 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1652 can invoke the API calls 1622 provided by the operating system 1614 to facilitate functionalities described herein.

Examples

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: receiving, from a first user device of a sender, a selection of a content item, the content item being adapted for presentation by an interaction application provided by an interaction system, and the sender having a first platform account within the interaction system; receiving, from the first user device, a selection of a recipient identified by a recipient identifier; determining that the recipient identifier is not linked to a platform account within the interaction system; causing transmission of an off-platform communication in an electronic format supported by a second user device associated with the recipient identifier, the off-platform communication containing a user-selectable registration link; detecting establishment of a second platform account within the interaction system, the second platform account being linked to the recipient identifier; and in response to the detecting of establishment of the second platform account: enabling the recipient to access the content item on the second user device via the interaction application; and establishing a relationship between the first platform account and the second platform account within the interaction system.

In Example 2, the subject matter of Example 1 includes, wherein determining that the recipient identifier is not linked to a platform account within the interaction system comprises: maintaining, for the interaction system, first electronic contact data for a plurality of users of the interaction system, each user having a platform account; accessing second electronic contact data, the second electronic contact data being associated with an external application of the sender, and wherein the second electronic contact data includes the recipient identifier; and determining that the recipient identifier is not linked to a platform account forming part of the first electronic contact data.

In Example 3, the subject matter of Example 2 includes, in response to determining that the recipient identifier is not linked to a platform account forming part of the first electronic contact data, causing presentation of the recipient identifier in a contact list, the recipient identifier being presented together with a user-selectable off-platform messaging selector, and the contact list being presented to the sender via a user interface provided by the interaction application.

In Example 4, the subject matter of Examples 2-3 includes, wherein the external application is a contacts application, the contacts application being distinct from the interaction application.

In Example 5, the subject matter of Examples 1-4 includes, wherein the enabling of the recipient to access the content item on the second user device comprises: detecting accessing of the interaction application by the recipient using the second platform account; and in response to the detecting of accessing of the interaction application by the recipient, causing presentation, via a user interface provided by the interaction application, of a message from the sender, the message including the content item.

In Example 6, the subject matter of Example 5 includes, wherein the off-platform communication does not include the content item, and the content item only becomes accessible by the recipient subsequent to establishment of the second platform account linked to the recipient identifier.

In Example 7, the subject matter of Example 6 includes, wherein the message is designated as a pending message within the interaction system prior to establishment of the second platform account linked to the recipient identifier and is made available to the recipient in response to the detecting of establishment of the second platform account linked to the recipient identifier.

In Example 8, the subject matter of Examples 1-7 includes, prior to the detecting of establishment of the second platform account: establishing, within the interaction system, a pending relationship request in association with the first platform account and the recipient identifier, wherein the pending relationship request is automatically converted to an active relationship request in response to the detecting of establishment of the second platform account, the active relationship request being a request to establish a bidirectional relationship between the sender and the recipient in the context of the interaction system.

In Example 9, the subject matter of Examples 1-8 includes, wherein the relationship established between the first platform account and the second platform account is a one-directional relationship.

In Example 10, the subject matter of Example 9 includes, subsequent to establishing the one-directional relationship between the first platform account and the second platform account within the interaction system: receiving, from the second user device, a selection of a user-selectable relationship establishment element; in response to receiving the selection of the user-selectable relationship establishment element, automatically converting the one-directional relationship to a bidirectional relationship between the first platform account and the second platform account; and storing a record of the bidirectional relationship within the interaction system.

In Example 11, the subject matter of Examples 1-10 includes, wherein the enabling of the recipient to access the content item on the second user device comprises presenting, via the interaction application, a messaging user interface including a mechanism to establish a bidirectional relationship with the sender in the context of the interaction system.

In Example 12, the subject matter of Examples 1-11 includes, in response to the detecting of establishment of the second platform account: causing presentation, on the second user device via a user interface provided by the interaction application, of a user suggestion, the user suggestion including profile data of the sender and being indicative of an option to establish a bidirectional relationship with the sender in the context of the interaction system.

In Example 13, the subject matter of Examples 1-12 includes, receiving a selection of the registration link via the second user device; and in response to receiving the selection of the registration link, automatically initiating an electronic account registration process.

In Example 14, the subject matter of Examples 1-13 includes, wherein the establishing of the relationship between the first platform account and the second platform account within the interaction system comprises establishing the relationship between the first platform account and the second platform account based on whether the registration link in the off-platform communication was used in an electronic account registration process for the second platform account.

In Example 15, the subject matter of Example 14 includes, wherein the establishing of the relationship between the first platform account and the second platform account within the interaction system further comprises: detecting that the registration link in the off-platform communication was used in the electronic account registration process for the second platform account; and in response to detecting that the registration link in the off-platform communication was used in the electronic account registration process for the second platform account, automatically establishing the relationship between the first platform account and the second platform account as a bidirectional relationship.

In Example 16, the subject matter of Examples 14-15 includes, wherein the establishing of the relationship between the first platform account and the second platform account within the interaction system further comprises: detecting that the registration link in the off-platform communication was not used in the electronic account registration process for the second platform account; and in response to detecting that the registration link in the off-platform communication was not used in the electronic account registration process for the second platform account, automatically establishing the relationship between the first platform account and the second platform account as a one-directional relationship.

In Example 17, the subject matter of Examples 1-16 includes, wherein the off-platform communication is a text message.

In Example 18, the subject matter of Examples 1-17 includes, wherein the recipient identifier is a phone number, and the off-platform communication is a Short Message Service (SMS) message.

Example 19 is a system comprising: a memory that stores instructions; and one or more processors configured by the instructions to perform operations comprising: receiving, from a first user device of a sender, a selection of a content item, the content item being adapted for presentation by an interaction application provided by an interaction system, and the sender having a first platform account within the interaction system; receiving, from the first user device, a selection of a recipient identified by a recipient identifier; determining that the recipient identifier is not linked to a platform account within the interaction system; causing transmission of an off-platform communication in an electronic format supported by a second user device associated with the recipient identifier, the off-platform communication containing a user-selectable registration link; detecting establishment of a second platform account within the interaction system, the second platform account being linked to the recipient identifier; and in response to the detecting of establishment of the second platform account: enabling the recipient to access the content item on the second user device via the interaction application; and establishing a relationship between the first platform account and the second platform account within the interaction system.

Example 20 is a non-transitory computer-readable storage medium, the computer-readable storage medium including instructions that when executed by at least one computer, cause the at least one computer to perform operations comprising: receiving, from a first user device of a sender, a selection of a content item, the content item being adapted for presentation by an interaction application provided by an interaction system, and the sender having a first platform account within the interaction system; receiving, from the first user device, a selection of a recipient identified by a recipient identifier; determining that the recipient identifier is not linked to a platform account within the interaction system; causing transmission of an off-platform communication in an electronic format supported by a second user device associated with the recipient identifier, the off-platform communication containing a user-selectable registration link; detecting establishment of a second platform account within the interaction system, the second platform account being linked to the recipient identifier; and in response to the detecting of establishment of the second platform account: enabling the recipient to access the content item on the second user device via the interaction application; and establishing a relationship between the first platform account and the second platform account within the interaction system.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

Examples of the present disclosure improve the functionality of electronic messaging software and systems by enhancing users' experience of using an interaction system. The users' experience of using an interaction system may be enhanced by enabling users to utilize external messaging functionality, also referred to as off-platform messaging functionality.

Further, an experience may be enhanced by automatically linking a relationship request to an off-platform message. This may facilitate on-boarding of new users to a platform and interactions between new and existing users, including reducing the number of steps or actions required to establish relationships and allowing electronic interactions within an interaction system.

Examples in the present disclosure may address or alleviate technical hurdles to communications and establishment of electronic relationships between users of an interaction system, such as a messaging platform. A technical problem of linking a registered user of an interaction platform with a non-user may be addressed by "pre-linking" the user and the non-user through establishment a pending relationship request that is automatically converted to an active relationship request (or that automatically results in a bidirectional link) in response to the non-user subsequently registering with the interaction platform. A technical problem of making an on-platform message available to a user without a platform account may be addressed by first delivering an off-platform invitation and then establishing a pending or queued message that is automatically delivered or presented to the new user on-platform once the user registers a platform account. Further, a technical problem of connecting users of a platform who have previously communicated via an off-platform channel may be addressed by linking a new user's registration to an off-platform identifier (e.g., a phone number) and, in response to the new user joining the platform, automatically surfacing suggested users who have communicated with the new user using that off-platform identifier.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" or "user device" refers to any machine that interfaces to a communications network to obtain resources from one or more server systems or other client/user devices. A client/user device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, wearable device, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium"

and "signal medium" mean the same thing and may be used interchangeably in this disclosure.

What is claimed is:

1. A method comprising:
maintaining first electronic contact data for a plurality of users, each user having an account with an interaction system;
receiving, from a first device of a sender, a selection of a content item, the content item being adapted for presentation by a first application provided by the interaction system, and the sender having a first account with the interaction system;
obtaining a recipient identifier of a recipient of the content item from second electronic contact data associated with a second application of the sender, wherein the recipient identifier is not linked to an account forming part of the first electronic contact data;
causing transmission of an off-platform communication in an electronic format supported by a second device associated with the recipient identifier;
detecting, subsequent to establishment of a second account with the interaction system linked to the recipient identifier, accessing of a messaging user interface of the first application by the recipient; and
in response to the detecting of the accessing of the messaging user interface by the recipient, causing presentation, in the messaging user interface, of:
profile data of the sender and a user-selectable relationship establishment element; and
a message from the sender comprising the content item, thereby enabling the recipient to access the content item via the first application.

2. The method of claim 1, wherein the recipient identifier is presented in a contact list, the contact list being presented to the sender for selection of the recipient identifier via a sending user interface provided by the first application.

3. The method of claim 1, wherein the second application is a contacts application on the first device, the contacts application being distinct from the first application.

4. The method of claim 1, wherein the message is presented simultaneously with the profile data of the sender and the user-selectable relationship establishment element.

5. The method of claim 1, wherein the message is designated as a pending message within the interaction system prior to establishment of the second account linked to the recipient identifier, and is made available to the recipient in response to the detecting of establishment of the second account linked to the recipient identifier.

6. The method of claim 1, wherein the off-platform communication does not include the content item, and the content item only becomes accessible by the recipient subsequent to establishment of the second account linked to the recipient identifier.

7. The method of claim 1, wherein the user-selectable relationship establishment element is for the recipient to establish a one-directional relationship with the sender in a context of the interaction system.

8. The method of claim 1, wherein the user-selectable relationship establishment element is to request establishment of a bidirectional relationship between the sender and the recipient in a context of the interaction system.

9. The method of claim 1, wherein the user-selectable relationship establishment element is for the recipient to approve establishment of a bidirectional relationship between the sender and the recipient in a context of the interaction system.

10. The method of claim 1, further comprising:
detecting that the sender has established a one-directional relationship with the recipient in a context of the interaction system; and
in response to detecting that the sender has established the one-directional relationship with the recipient, presenting the user-selectable relationship establishment element as an accept button that enables establishment of a bidirectional relationship between the sender and the recipient.

11. The method of claim 1, wherein the profile data of the sender and the user-selectable relationship establishment element are presented within a user suggestion.

12. The method of claim 11, wherein the user suggestion is one of a plurality of user suggestions simultaneously presented in the messaging user interface.

13. The method of claim 1, wherein the off-platform communication contains a user-selectable registration link.

14. The method of claim 13, further comprising:
receiving a selection of the registration link via the second device; and
in response to receiving the selection of the registration link, automatically initiating an electronic account registration process.

15. The method of claim 1, further comprising:
receiving, from the second device, a selection of the user-selectable relationship establishment element in the messaging user interface;
in response to receiving the selection of the user-selectable relationship establishment element, automatically establishing a relationship between the sender and the recipient; and
storing a record of the relationship within the interaction system in which the first account is associated with the second account.

16. The method of claim 15, wherein the establishing of the relationship between the sender and the recipient comprises selecting a type of relationship based on whether a registration link contained in the off-platform communication was used in an electronic account registration process for the second account.

17. The method of claim 1, wherein the recipient identifier comprises a phone number, and the off-platform communication comprises a text message addressed to the phone number.

18. A system comprising:
a memory that stores instructions; and
one or more processors configured by the instructions to perform operations comprising:
maintaining first electronic contact data for a plurality of users, each user having an account with an interaction system;
receiving, from a first device of a sender, a selection of a content item, the content item being adapted for presentation by a first application provided by the interaction system, and the sender having a first account with the interaction system;
obtaining a recipient identifier of a recipient of the content item from second electronic contact data associated with a second application of the sender, wherein the recipient identifier is not linked to an account forming part of the first electronic contact data;
causing transmission of an off-platform communication in an electronic format supported by a second device associated with the recipient identifier;
detecting, subsequent to establishment of a second account with the interaction system linked to the recipient identifier, accessing of a messaging user interface of the first application by the recipient; and in response to the detecting of the accessing of the messaging user interface by the recipient, causing presentation, in the messaging user interface, of:
profile data of the sender and a user-selectable relationship establishment element; and
a message from the sender comprising the content item, thereby enabling the recipient to access the content item via the first application.

19. The system of claim 18, wherein the message is presented simultaneously with the profile data of the sender and the user-selectable relationship establishment element.

20. A non-transitory computer-readable storage medium, the computer-readable storage medium including instructions that when executed by at least one computer, cause the at least one computer to perform operations comprising:

maintaining first electronic contact data for a plurality of users, each user having an account with an interaction system;

receiving, from a first device of a sender, a selection of a content item, the content item being adapted for presentation by a first application provided by the interaction system, and the sender having a first account with the interaction system;

obtaining a recipient identifier of a recipient of the content item from second electronic contact data associated with a second application of the sender, wherein the recipient identifier is not linked to an account forming part of the first electronic contact data;

causing transmission of an off-platform communication in an electronic format supported by a second device associated with the recipient identifier;

detecting, subsequent to establishment of a second account with the interaction system linked to the recipient identifier, accessing of a messaging user interface of the first application by the recipient; and in response to the detecting of the accessing of the messaging user interface by the recipient, causing presentation, in the messaging user interface, of:
profile data of the sender and a user-selectable relationship establishment element; and
a message from the sender comprising the content item, thereby enabling the recipient to access the content item via the first application.

* * * * *

UNITED STATES PATENT AND TRADEMARK OFFICE
CERTIFICATE OF CORRECTION

| | | Page 1 of 1 |
|---|---|---|
| PATENT NO. | : 12,335,211 B2 | |
| APPLICATION NO. | : 18/608763 | |
| DATED | : June 17, 2025 | |
| INVENTOR(S) | : Boyd et al. | |

It is certified that error appears in the above-identified patent and that said Letters Patent is hereby corrected as shown below:

On the Title Page

On page 9, in Column 1, under "Other Publications", Line 2, delete "malled" and insert --mailed-- therefor On page 9, in Column 1, under "Other Publications", Line 11, delete "malled" and insert --mailed-- therefor On page 9, in Column 1, under "Other Publications", Line 19, delete "malled" and insert --mailed-- therefor Signed and Sealed this
Third Day of February, 2026

John A. Squires
*Director of the United States Patent and Trademark Office*